US011707806B2

(12) United States Patent
Becker et al.

(10) Patent No.: US 11,707,806 B2
(45) Date of Patent: Jul. 25, 2023

(54) VIRTUAL MARKINGS IN WELDING SYSTEMS

(71) Applicant: ILLINOIS TOOL WORKS INC., Glenview, IL (US)

(72) Inventors: William Joshua Becker, Manitowoc, WI (US); Olivia Arreola, Redgranite, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 1060 days.

(21) Appl. No.: 16/273,980

(22) Filed: Feb. 12, 2019

(65) Prior Publication Data

US 2020/0254572 A1  Aug. 13, 2020

(51) Int. Cl.
  *B23K 31/12*   (2006.01)
  *G06T 19/00*   (2011.01)
  *G09B 19/00*   (2006.01)
  *G06Q 10/0639* (2023.01)

(52) U.S. Cl.
  CPC .......... *B23K 31/125* (2013.01); *G06T 19/006* (2013.01); *G09B 19/003* (2013.01); *G06Q 10/06398* (2013.01)

(58) Field of Classification Search
  None
  See application file for complete search history.

(56) References Cited

U.S. PATENT DOCUMENTS

| 6,583,386 | B1 | 6/2003 | Ivkovich |
| 8,680,434 | B2 | 3/2014 | Stoger et al. |
| 9,895,267 | B2 | 2/2018 | Cole |
| 10,068,495 | B2 | 9/2018 | Boulware et al. |
| 2006/0028400 | A1* | 2/2006 | Lapstun ............... H04N 13/344 345/8 |
| 2013/0206741 | A1* | 8/2013 | Pfeifer .................... G01S 11/14 219/130.01 |
| 2014/0104189 | A1* | 4/2014 | Marshall ............... G06F 3/0488 345/173 |

(Continued)

OTHER PUBLICATIONS

International Search Report and Written Opinion, International Patent Application No. PCT/US2020/017726, dated Jun. 3, 2020, 12 pages.

*Primary Examiner* — David H Chu
(74) *Attorney, Agent, or Firm* — McAndrews, Held & Malloy, Ltd.

(57) ABSTRACT

Apparatus, systems, and/or methods are disclosed relating to welding systems that allow for virtual marking of welding workpieces. In some examples, a virtual marking process of the welding system generates and/or displays one or more markings on a display of the welding system in response to a dynamic input. In some examples, the dynamic input may comprise one or more of a user input received via a user interface, a marking instrument, and/or a welding gun of the welding system. In some examples, the dynamic input may comprise images captured by the welding system and recognized by the welding system as indicating markings. In some examples, the markings may guide an operator by indicating weld locations and/or weld order. In some examples, the markings may include embedded marking data (and/or metadata) that may be accessed and/or displayed to provide additional information and/or guidance to the operator.

16 Claims, 14 Drawing Sheets

(56) References Cited

U.S. PATENT DOCUMENTS

| | | | |
|---|---|---|---|
| 2014/0184496 A1* | 7/2014 | Gribetz | G06F 3/013 |
| | | | 345/156 |
| 2015/0178969 A1* | 6/2015 | Yoo | G16H 40/63 |
| | | | 345/589 |
| 2016/0125763 A1* | 5/2016 | Becker | B23K 9/322 |
| | | | 434/234 |
| 2016/0191887 A1* | 6/2016 | Casas | H04N 13/279 |
| | | | 348/47 |
| 2016/0196692 A1* | 7/2016 | Kjallstrom | G06F 3/04815 |
| | | | 345/633 |
| 2016/0260261 A1 | 9/2016 | Hsu | |
| 2016/0353055 A1* | 12/2016 | Popescu | G06T 19/006 |
| 2017/0046976 A1* | 2/2017 | Becker | B23K 9/282 |
| 2017/0053557 A1* | 2/2017 | Daniel | G09B 19/24 |
| 2018/0126476 A1 | 5/2018 | Meess et al. | |
| 2018/0130226 A1* | 5/2018 | Meess | G09B 19/24 |
| 2018/0130376 A1 | 5/2018 | Meess et al. | |

* cited by examiner

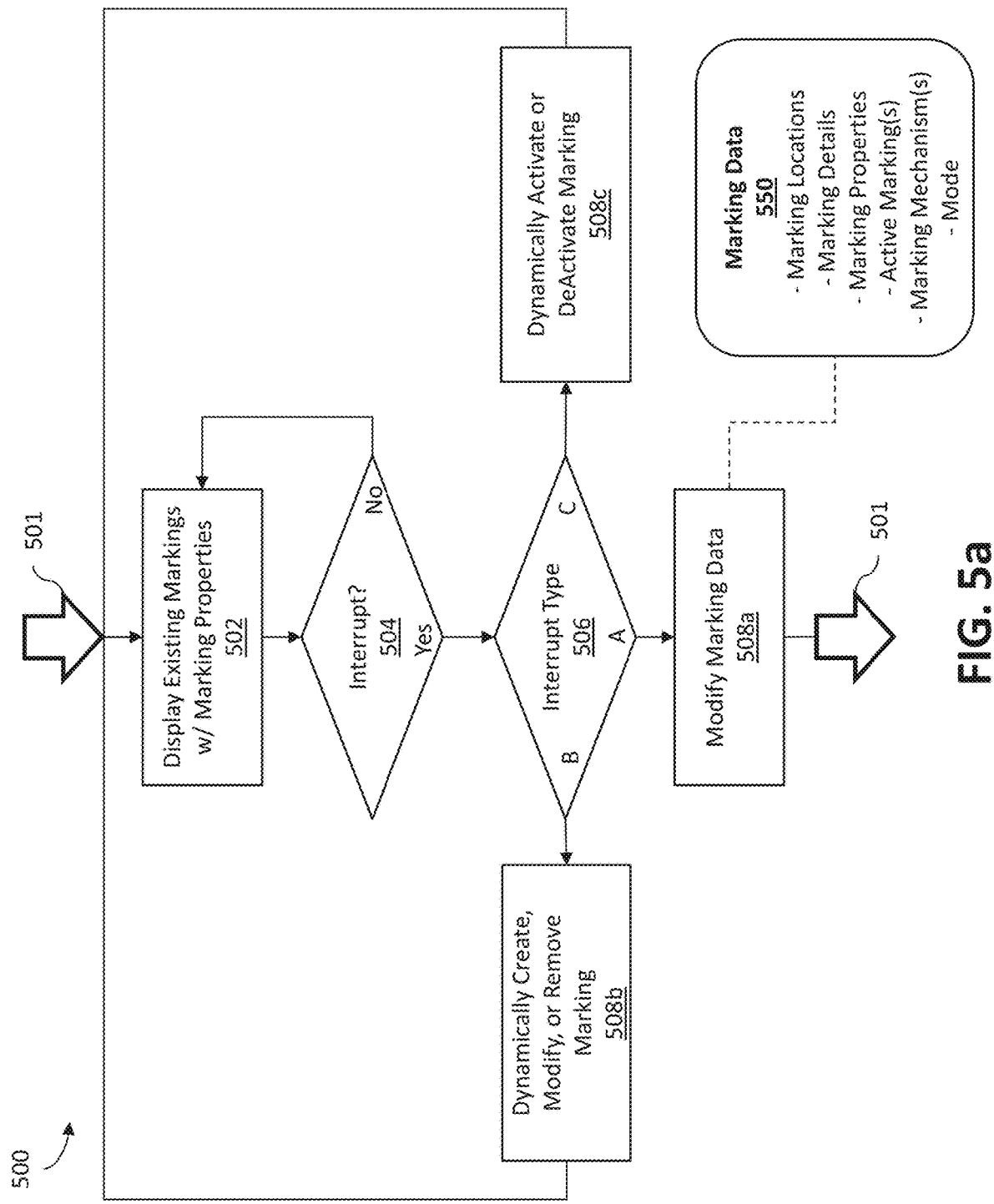

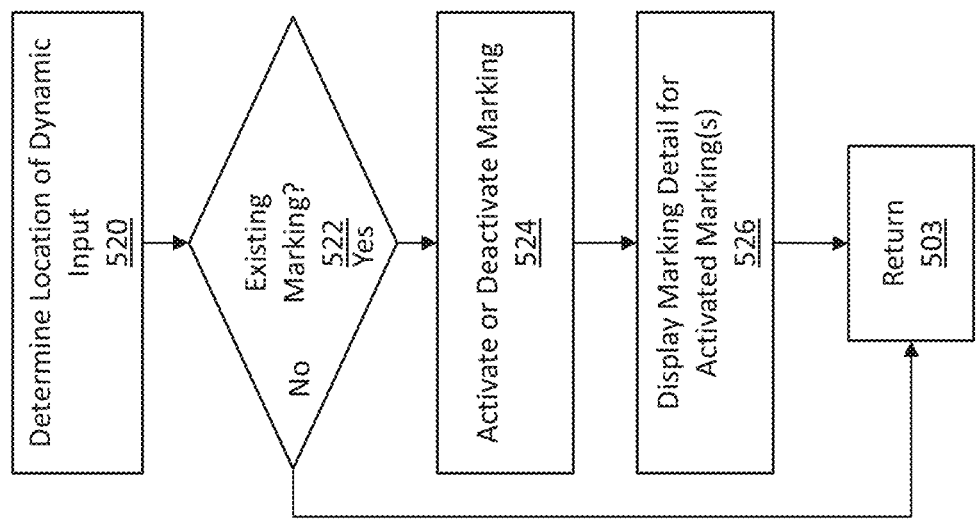

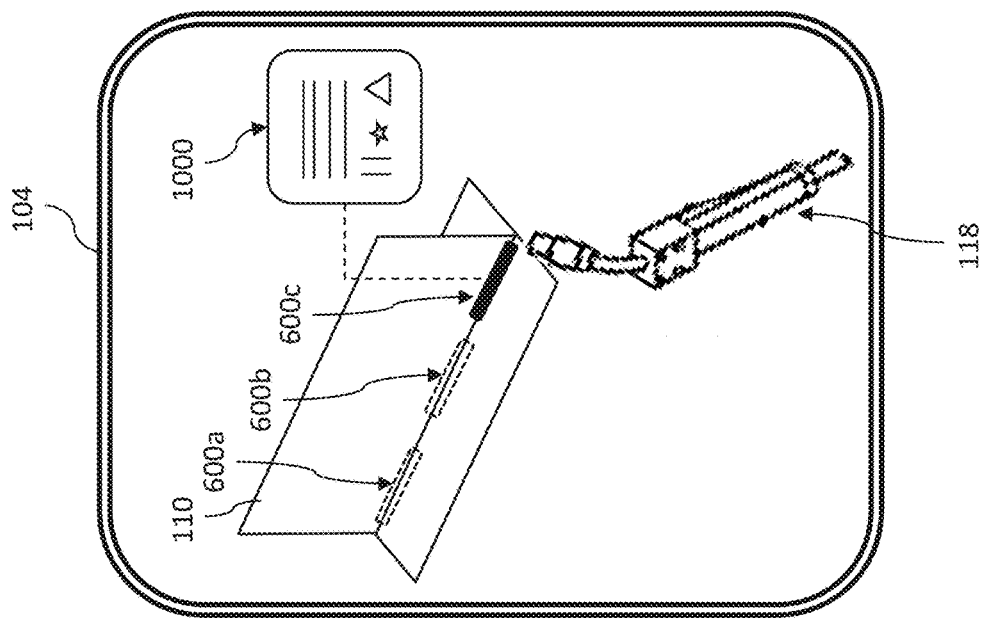
FIG. 10c
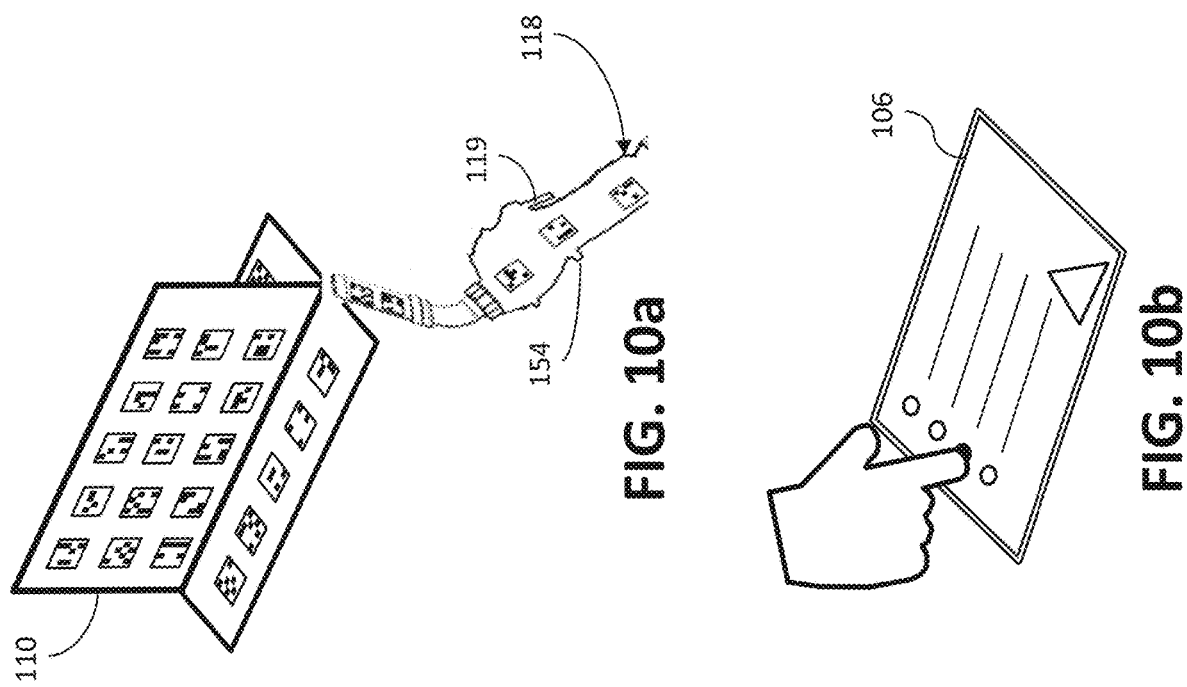
FIG. 10a
FIG. 10b

VIRTUAL MARKINGS IN WELDING SYSTEMS

TECHNICAL FIELD

The present disclosure generally relates to welding systems and, more particularly, to virtual marking of workpieces in welding systems.

BACKGROUND

Correctly completing all required welds at the specified locations and in the specified order is important to ensuring the quality of a finished assembly. Welding out of sequence or at incorrect locations can cause warpage, distortion, and/or other undesirable effects symptomatic of a poorly welded assembly. In conventional welding operations, locations and/or sequences of welds may be marked on an actual workpiece by operator using a pen, marker, or other writing utensil, so as to help guide the operator during welding. However, this may not be possible for simulated welding operations, and/or for welding operations where the workpieces are resistant to conventional markings.

Limitations and disadvantages of conventional and traditional approaches will become apparent to one of skill in the art, through comparison of such systems with the present disclosure as set forth in the remainder of the present application with reference to the drawings.

SUMMARY

The present disclosure is directed to virtual marking of workpieces in welding systems, for example, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

FIGS. 5a-5c are flow diagrams illustrating an example virtual marking process of the welding system of FIGS. 1 and 2, in accordance with aspects of this disclosure.

FIGS. 10a-10c illustrate example welding system components and virtual marking outputs to a display screen of the welding system of FIGS. 1 and 2, in accordance with aspects of this disclosure.

The figures are not necessarily to scale. Where appropriate, the same or similar reference numerals are used in the figures to refer to similar or identical elements.

DETAILED DESCRIPTION

Figure 1:
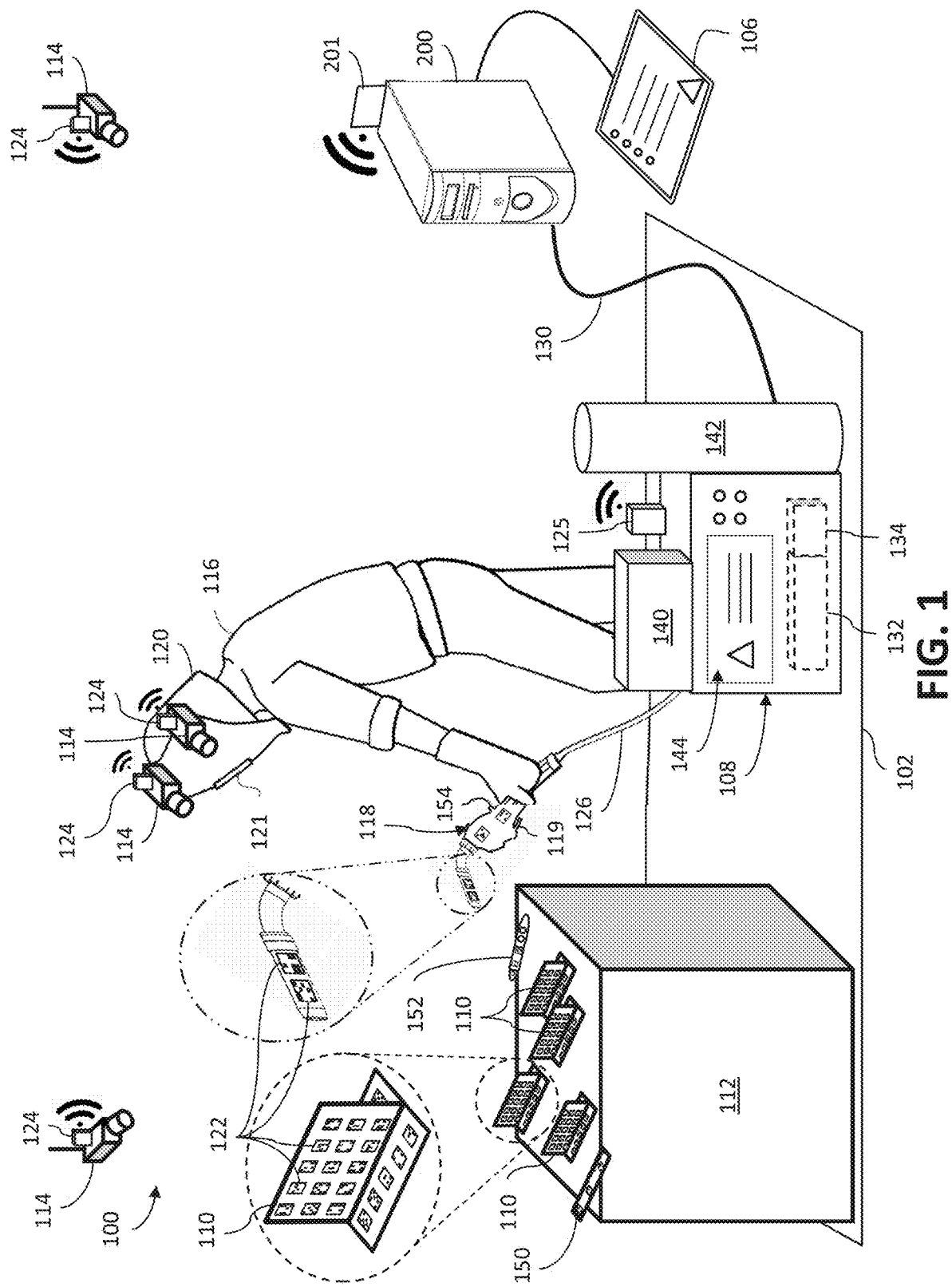
FIG. 1 is a diagram illustrating components of an example welding system, in accordance with aspects of this disclosure.

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type power refers to power suitable for welding, cladding, brazing, plasma cutting, induction heating, carbon arc cutting, and/or hot wire welding/preheating (including laser welding and laser cladding), carbon arc cutting or gouging, and/or resistive preheating.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging, and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Some examples of the present disclosure relate to welding system, comprising a display screen configured to display a rendering, processing circuitry, and a machine readable storage device comprising machine readable instructions which, when executed, cause the processing circuitry to receive a dynamic input indicating a selected location on a workpiece, and generate, on the display screen, a marking on the workpiece based on the selected location.

In some examples, the dynamic input comprises a first dynamic input and the selected location comprises a first selected location, and the machine readable instructions, when executed, further cause the processing circuitry to generate, on the display screen, a first marking at a first point corresponding to the first selected location, receive a second dynamic input indicating a second selected location on the workpiece, generate, on the display screen, a second marking at a second point corresponding to the second selected location, and connect, on the display screen, the first marking and second marking to create the marking. In some examples, the dynamic input comprises a first dynamic input and the selected location comprises a first selected location, and the machine readable instructions, when executed, further cause the processing circuitry to generate, on the display screen, a first marking at a first point corresponding to the first selected location, receive a series of second dynamic inputs indicating a series of second selected locations on the workpiece, and generate, on the display screen, a series of second markings extending from the first marking, the second markings corresponding to the second selected locations, wherein the marking comprises the first marking and second markings.

In some examples, the machine readable instructions, when executed, further cause the processing circuitry to generate, on the display screen, dimensions overlaid on the workpiece to aid in creating the marking. In some examples, the dynamic input comprises a first dynamic input, and the machine readable instructions, when executed, further cause the processing circuitry to receive a second dynamic input indicating the selected location on the workpiece, and remove the marking at the selected location on the workpiece. In some examples, the machine readable instructions, when executed, further cause the processing circuitry to set one or more properties of the marking, the one or more properties comprising one or more of a color or a thickness. In some examples, the one or more properties comprise one or more first properties, and wherein the machine readable instructions, when executed, further cause the processing circuitry to apply the one or more first properties to the marking during a markup mode, and apply one or more second properties to the marking outside of the markup mode. In some examples, the machine readable instructions, when executed, further cause the processing circuitry to receive an input indicative of a selected marking mechanism and generate the marking using the selected marking mechanism. In some examples, the system further comprises one or more cameras configured to capture one or more images, and the machine readable instructions, when executed, further cause the processing circuitry to generate the rendering and determine the selected location corresponding to the dynamic input based on the one or more images. In some examples, wherein the dynamic input comprises a signal from a welding torch.

Some examples of the present disclosure relate to a method of marking in a welding system, comprising displaying, on a display screen, a rendering of a workpiece, receiving, via processing circuitry, a dynamic input indicating a selected location on the workpiece, and generating, on the display screen, a marking on the workpiece based on the selected location.

In some examples, the dynamic input comprises a first dynamic input and the selected location comprises a first selected location, the method further comprising generating, on the display screen, a first marking at a first point corresponding to the first selected location, receiving a second dynamic input indicating a second selected location on the workpiece, generating, on the display screen, a second marking at a second point corresponding to the second selected location, and connecting, on the display screen, the first marking and second marking to create the marking. In some examples, the dynamic input comprises a first dynamic input and the selected location comprises a first selected location, the method further comprising generating, on the display screen, a first marking at a first point corresponding to the first selected location, receiving a series of second dynamic inputs indicating a series of second selected locations on the workpiece, and generating, on the display screen, a series of second markings extending from the first marking, the second markings corresponding to the second selected locations, wherein the marking comprises the first marking and second markings.

In some examples, the method further comprises generating, on the display screen, dimensions overlaid on the workpiece to aid in creating the marking. In some examples, the dynamic input comprises a first dynamic input, and the method further comprises receiving a second dynamic input indicating the selected location on the workpiece, and removing the marking at the selected location on the workpiece. In some examples, the method further comprises setting one or more properties of the marking, the one or more properties comprising one or more of a color or a thickness. In some examples, the one or more properties comprise one or more first properties, and wherein the method further comprises applying the one or more first properties to the marking during a markup mode, and applying the one or more second properties to the marking outside of the markup mode. In some examples, the method further comprises receiving an input indicative of a selected marking mechanism and generating the marking using the selected marking mechanism. In some examples, the method further comprises capturing one or more images via one or more cameras, generating the rendering based on the images, and determining the selected location corresponding to the dynamic input based on the images. In some examples, the dynamic input comprises a signal from a welding torch.

Some examples of the present disclosure relate to welding systems that monitor welds performed by an operator. In some examples, the welding system monitors one or more welds performed using a welding tool, evaluates characteristics of the one or more welds in comparison to certain predetermined criteria, and determines a performance score for the operator based on the evaluation. In some examples, the characteristics of the one or more welds include the location of each of the one or more welds and/or the order in which the one or more welds are executed. In such an example, the predetermined criteria may include target locations for each of the one or more welds and/or a target order of execution. In some examples, the weld monitoring process may respond to deviations from the target locations and/or target order, such as by reducing a performance score, disabling weld operations, providing guidance to the operator, etc.

Some examples of the present disclosure further relate to welding systems that allow for virtual marking of welding workpieces, such as to provide guidance to welding operators, for example. In some examples, the welding system generates and/or displays one or more virtual markings on a display of the welding system in response to a static input (e.g., predetermined virtual marking data, such as may be stored in memory). However, in some examples, a welding operator (or other user or program) may wish to generate virtual markings on the fly. Thus, in some examples, the welding system generates and/or displays one or more virtual markings on a display of the welding system in response to a dynamic input.

In some examples, the dynamic input may comprise one or more of a user input received via a user interface, a marking instrument, and/or a welding gun of the welding system. In some examples, the dynamic input may comprise images captured by the welding system and recognized by the welding system. In some examples, the virtual markings may guide an operator by indicating weld locations and/or weld order. In some examples, the virtual markings may be associated with certain details (and/or metadata) that may be accessed and/or displayed to provide additional information and/or guidance to the operator.

FIG. 1 shows an example of a welding system 100. In some examples, the welding system 100 may be used for weld training. In some examples, the welding system 100 may be used for live welding (e.g., in a factory, shipyard, construction site, etc.). In some examples the welding system 100 may include a live welding system and/or an augmented (and/or virtual and/or mixed) reality welding system.

In the example of FIG. 1, the welding system 100 includes a plurality of cameras 114 focused on a welding cell 102, a welding torch 118 coupled to a welding-type power supply 108 within the welding cell 102, and a computing system 200 in communication with the welding-type power supply 108, the welding torch 118 (e.g., via the welding-type power supply 108), and cameras 114. In some examples, the welding-type power supply 108 is omitted, and the welding torch 118 is in direct communication with the computing system 200. In the example of FIG. 1, the welding system 100 additionally includes ruler 150 and marking utensil 152 atop welding bench 112, near workpieces 110 (though, in some examples, the ruler 150 and/or marking utensil 152 may also be omitted). In some examples, ultrasonic, radio frequency, magnetic, audio, and/or millimeter wave sensors may be used instead of, or in addition to, the cameras 114.

In the example of FIG. 1, an operator 116 is handling the welding torch 118 near the welding bench 112. In the example of FIG. 1, the welding torch 118 is a gun configured for gas metal arc welding (GMAW). In some examples, the welding torch 118 may comprise an electrode holder (i.e., stinger) configured for shielded metal arc welding (SMAW). In some examples, the welding torch 118 may comprise a torch and/or filler rod configured for gas tungsten arc welding (GTAW). In some examples, the welding torch 118 may comprise a gun configured for flux-cored arc welding (FCAW). In some examples, the welding torch 118 may additionally, or alternatively, comprise a filler rod. As shown in the example of FIG. 1, the welding torch 118 includes a trigger 119 and a secondary input 154 (e.g., trigger, switch, button, knob, and/or other input interface). In some examples, the trigger 119 may be activated by the operator 116 to trigger a welding operation. In some examples, the secondary input 154 may be activated (e.g., by the operator) to initiate (or otherwise impact) a virtual marking operation. In some examples, the secondary input 154 may act as an input to change modes (e.g., between a markup mode, an informational mode, and/or an operational mode). In some examples, the welding torch 118 may include additional inputs (not shown).

As shown, the operator 116 is wearing a welding helmet 120 while using the welding torch 118. In the example of FIG. 1, the welding helmet 120 has a faceplate 121. In some examples, the faceplate 121 comprises a transparent (or semi-transparent) lens through which an operator 116 may view welding operations. In some examples, an electronic display screen 104 (shown in FIG. 2) is secured within the welding helmet 120. In some examples, the electronic display screen 104 may be part of the faceplate 121, and/or vice versa. In some examples, the electronic display screen 104 may be entirely separate from the welding helmet 120. In some examples, the electronic display screen 104 may be a laminate overlaying some or all of the faceplate 121, such that the operator 116 may look through the faceplate 121 and view (at least portions of) the display screen 104 simultaneously.

In the example of FIG. 1, the welding system 100 includes several cameras 114. In some examples, the cameras 114 may include thermal cameras, infrared cameras, optical cameras, and/or digital video cameras. As shown, some cameras 114 are positioned around the welding cell 102, such as hung from the ceiling and/or attached to some other fixture. As shown, several cameras 114 are also attached to the welding helmet 120. In the example of FIG. 1, there are two cameras 114 attached to the welding helmet 120. While, in some examples, only one camera 114 may be used, two cameras 114 may improve accuracy and/or precision of spatial and/or depth perception, object recognition, and/or image processing. In some examples there may be a third camera 114 that is hidden or obscured in FIG. 1 due to the stance of the operator 116. In some examples, the third camera may improve accuracy and/or precision of spatial and/or depth perception and/or processing. In examples where there are three cameras 114, the cameras 114 may be arranged in a triangle configuration. In some examples, the cameras 114 are movably mounted, and/or have movable lenses configured to redirect a focus (and/or adjust certain attributes) of the cameras 114, such as in response to one or more command signals (e.g., received from computing system 200 and/or camera controller(s) 124).

In the example of FIG. 1, each camera 114 has its own camera controller 124. In some examples, multiple cameras 114 may share controllers 124. In some examples, the controllers 124 may be embodied in the cameras 114 themselves. In some examples, the cameras 114 are configured to capture images of the ruler 150, marking utensil 152, welding torch 118, workpieces 110, and/or other objects within and/or relating to the welding cell 102. In some examples, the cameras 114 are configured to encode the captured images in image signals. In some examples, the camera controller(s) 124 are configured to control the cameras 114, collect image signals from the cameras 114, and/or communicate the image signals (and/or data representative of the image signals or encoded images) to the computing system 200. In some examples, the controllers 124 comprise appropriate communication circuitry (e.g., hardware, firmware, and/or software) to communicate with the computing system 200 (e.g., IEEE 2502.X and/or 802.11x compliant wireless and/or wired communications hardware for transmitting and/or receiving communications).

In the example of FIG. 1, the workpieces 110 and welding torch 118 within the welding cell 102 include markers 122 (e.g., unique pattern markers). FIGS. 7a-8d additionally show the ruler 150 and marking utensil 152 including markers 122. In some examples, the markers 122 are configured to facilitate image capture by the cameras 114 and/or image interpretation by the computing system 200. In some examples, the markers 122 may be removably attached to the ruler 150, marking utensil 152, workpieces 110, and/or welding torch 118, such as through the use of adhesives, magnets, loop and hook fasteners, etc. In some examples, markers 122 may be attached to other welding components and/or items (e.g., clamps, welding-type power supply 108, bench 112, etc.) within the welding cell 102. In some examples, the markers 122 facilitate image capture, image processing, object recognition, object tracking, and/or position/orientation detection of the objects to which the markers 122 are attached, as well as other objects in proximity. In some examples, the markers 122 may be active or passive. In some examples, the markers 122 may be omitted, and the welding system 100 may perform its object recognition, object tracking, and/or position detection using markerless techniques.

In the example of FIGS. 7a-8d, the ruler 150 includes markings 122 that may assist the welding system 100 (e.g., cameras 114 and/or computing system 200) in recognizing and/or locating the ruler 150. In some examples, measurements 156 on the ruler 150 may be used to guide an operator 116 or other user when creating virtual markings 600, as further discussed below. As shown, the computing system 200 displays the measurements 156 in the display screen 104 in the same relative location on the workpiece 110 as the measurements 156 on the actual ruler 150. In operation, the measurements 156 may assist the operator 116 in welding operations and/or virtual marking. In some examples, the ruler 150 may be omitted, and the measurements 156 may be displayed without the ruler 150 (e.g., by using known measurements and/or models of the workpiece(s) 110 and/or other objects).

In the example of FIGS. 7a-8d, the marking utensil 152 includes a body 158, a neck 160, and a tip 162. As shown, the neck 160 and tip 162 include markings 122. In some examples, the markings 122 may assist the weld system 100 (e.g., cameras 114 and/or computing system 200) in recognizing, locating, and/or orienting the marking utensil 152. In the example of FIGS. 7a-8d, the body 158 of the marking utensil 152 includes a first input 164 and a second input 166. While two inputs are shown, in some examples the marking utensil 152 may include more or less inputs. In the example of FIGS. 7a-8d, the first input 164 and second input 166 are depicted as buttons. In some examples, the first input 164 and/or second input 166 may instead be switches, dials, keys, knobs, and/or other appropriate user interface input mechanisms.

In some examples, the marking utensil 152 may include communication circuitry (not shown). In some examples, the marking utensil 152 may be configured to transmit (via communication circuitry) one or more signals to the computing system 200 (and/or welding-type power supply 108) in response to, and/or indicative of, user input via the first input 164 and/or second input 166. For example, activation (e.g., pressing, clicking, flipping, turning, etc.) of the first input 164 may induce the marking utensil 152 to send a signal indicative of a change of modes (e.g., between a markup mode, an informational mode, and/or an operational mode). As another example, activation (e.g., pressing, clicking, flipping, turning, etc.) of the second input 166 may induce the marking utensil 152 to send a signal indicative of creation, placement, modification, removal, and/or activation of a virtual marking 600. While the marking utensil 152 is depicted as a pen like utensil in the example of FIG. 1, in some examples, the marking utensil 152 may comprise some other utensil, such as, for example, a (live or mock) filler rod, welding electrode, welding torch, etc. In some examples, the welding torch 118 may be used to generate virtual markings on the workpieces 110 in place of, or in addition to, the marking utensil 152.

In some examples, the one or more of the workpieces 110 are mock workpieces, such as may be used for training purposes. In examples where one or more of the workpieces 110 comprise mock workpieces, the computing system 200 may store predetermined 3D models of the workpieces 110. In some examples, one or more of the workpieces 110 comprise live workpieces, such as may be used during live welding. In examples where one or more of the workpieces 110 comprise live workpieces, a 3D model of the workpieces 110 may be dynamically developed, such as through the use of a 3D scanner (not shown) and/or one or more template models. The computing system 200 may additionally (or alternatively) store 3D models of the ruler 150, marking utensil 152, welding bench 112 (and/or other fixtures), and/or welding torch 118, and use these models when determining position and/or orientation. In some examples, a calibration process may be used to assist with determining position and/or orientation.

In some examples, the cameras 114 may use the markers 122 to monitor and/or track the location and/or movement of the welding torch 118. In some examples, the welding torch 118 may be a live, functional, welding torch coupled to a live welding-type power supply 108. In some examples, the welding torch 118 may instead be a mock welding torch coupled to a mock welding-type power supply 108. In some examples, the mock welding-type power supply 108 may be implemented via computing system 200, and the welding torch 118 may be coupled directly to the computing system 200. In still other examples, the welding torch 118 may be a smart welding torch that can be selectively coupled to welding power or decoupled from welding power based on the desired welding or training task.

Figure 2:
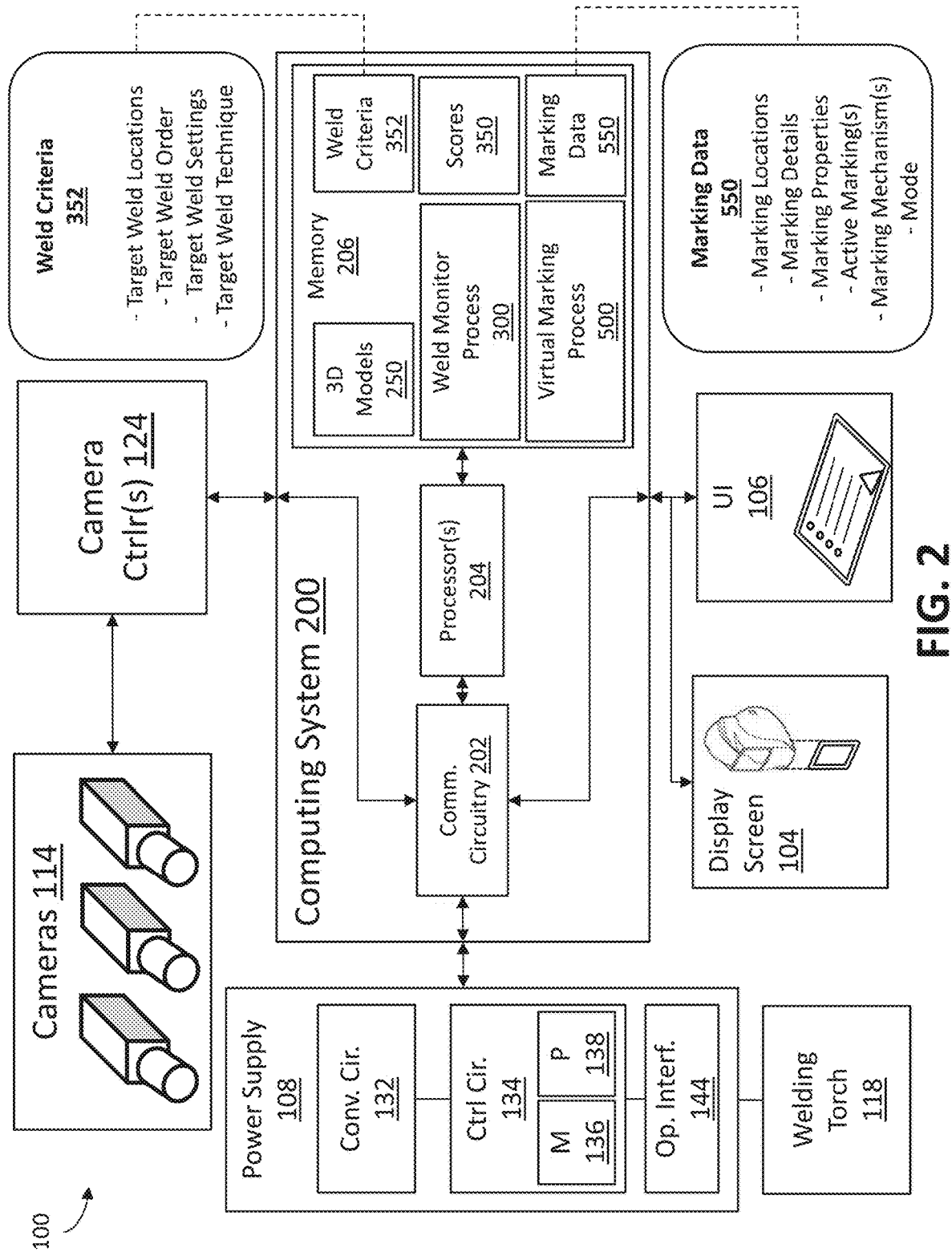
FIG. 2 is a block diagram further illustrating the components of the welding system of FIG. 1, in accordance with aspects of this disclosure.

In the example of FIG. 1, the welding torch 118 is coupled to the welding-type power supply 108 via a welding cable 126. The welding-type power supply 108 is, in turn, in communication with computing system 200, such as via a communication device 128 or a conduit 130. In examples where the welding torch 118 is a live welding torch and/or the welding-type power supply 108 is a live welding-type power supply 108, the welding-type power supply 108 outputs electrical power to the welding torch 118 via the welding cable 126. In the example of FIG. 1, the welding-type power supply 108 includes power conversion circuitry 132 configured to receive input power (e.g., from mains power, a generator, etc.) and convert the input power to welding-type power. As shown, the welding-type power supply 108 further includes control circuitry 134 configured to control the power conversion circuitry 132. In the example of FIG. 2, the control circuitry 134 includes one or more processors 136 and memory 138.

As shown, the welding-type power supply 108 further includes (and/or is coupled to) a wire feeder 140 and gas supply 142. In some examples, the welding-type power supply 108 may control output of wire and/or gas from the wire feeder 140 and/or gas supply 142. For example, control circuitry 134 within the welding-type power supply 108 may control a motor of the wire feeder 140 and/or a valve in communication with the gas supply 142 to regulate wire and/or gas delivered to the welding torch 118. In some examples, wire and/or gas from the wire feeder 140 and/or gas supply 142 may be delivered to the welding torch 118 through the welding cable 126. In live operation, when the operator 116 activates a trigger 119 of the welding torch 118, the welding torch 118 uses the welding-type power provided by the welding-type power supply 108 (and/or the welding wire and/or gas provided by the wire feeder 140 and/or gas supply 142) to apply a welding arc to one or more workpieces 110.

In the example of FIG. 1, the welding-type power supply 108 also includes an operator interface 144. The operator interface 144 comprises one or more adjustable inputs (e.g., knobs, buttons, switches, keys, etc.) and/or outputs (e.g., display screens, lights, speakers, etc.). In some examples, the operator 116 may use the operator interface 144 to enter and/or select one or more weld settings (e.g., voltage, current, gas type, wire feed speed, workpiece material type, filler type, etc.) for the welding-type power supply 108. In some examples, the weld settings may be stored in the memory 136 of the welding-type power supply 108. The welding-type power supply 108 may then control (e.g., via control circuitry 134) its operation according to the weld settings. In the example of FIG. 1, the operator interface 144 may further include one or more receptacles configured for connection to (and/or reception of) one or more external memory devices (e.g., floppy disks, compact discs, digital video disc, flash drive, etc.).

In some examples, the welding-type power supply 108 may communicate with computing system 200 through conduit 130 and/or communication device 125. In some examples, the computing system 200 may be implemented via the welding-type power supply 108 (e.g., via the control circuitry 134 of the welding-type power supply 108). In some examples, the welding torch 118 may additionally, or alternatively, be in direct communication with the computing system 200.

In the example of FIG. 1, the computing system 200 includes an antenna 201 through which the computing system 200 may wirelessly communicate with various devices of the welding system 100. In some examples, the antenna 201 comprises part (or all) of communication circuitry 202 (further discussed below with respect to FIG. 2) of the computing system 200. In some examples, the cameras 114, camera controllers 124, display screen 104, user interface 106, welding torch 118, welding-type power supply 108, marking utensil 152, and/or computing system 200 may communicate via one or more wired media and/or protocols (e.g., Ethernet cable(s), universal serial bus cable(s), other signal and/or communication cable(s)) and/or wireless mediums and/or protocols (e.g., near field communication (NFC), ultra high frequency radio waves (commonly known as Bluetooth), IEEE 802.11x, Zigbee, HART, LTE, Z-Wave, WirelessHD, WiGig, etc.). As shown the computing system 200 is further in communication with a user interface 106.

In the example of FIG. 1, the user interface 106 comprises a touch screen interface, such as a tablet, touch screen computer, smartphone or other touch screen device. In some examples, the user interface 106 may instead comprise more traditional input devices (e.g., mouse, keyboard, buttons, knobs, etc.) and/or output devices (e.g., display screen, speakers, etc.). In some examples, the user interface 106 may further include one or more receptacles configured for connection to (and/or reception of) one or more external memory devices (e.g., floppy disks, compact discs, digital video disc, flash drive, etc.).

In some examples, the user interface 106 may receive input from the operator 116 (or other sources) relating to operation of the computing system 200. In some examples, the user interface 106 may output information relating to operation of the welding system 100. For example, the user interface 106 may output a visual depiction of what the operator 116 sees on the display 104. As another example, the user interface 106 may output documentation (e.g., drawings, blueprints, diagrams, schematics, instructions, work orders, etc.) related to one or more weld projects. In some examples, an operator 116 may use the documentation to determine appropriate weld locations, weld order, weld settings, weld techniques, etc. In some examples, the documentation may include one or more explicit depictions and/or descriptions of the weld locations, weld order, weld settings, weld techniques, etc.

In some examples, the welding system 100 may be an augmented reality (AR) welding system, such as may be used in the context of weld training or AR live welding, for example. In some weld training examples, the welding torch 118 may be a mock welding torch configured for simulated welding (rather than live welding). In some welding training examples, the computing system 200 may be configured to generate a simulated rendering for display to the operator 116 (e.g., via display screen 104, discussed further below with respect to FIG. 2). For example, the simulated rendering may include a simulated arc, a simulated weld pool, renderings of the workpieces 110 that make the workpieces 110 appear to be of a different material, etc. In some examples, the simulated rendering may based on images captured by the cameras 114 in conjunction with one or more user adjustable settings and/or inputs. For example, certain welding components (e.g., trigger 119 of the welding torch 118, user interface 106, etc.) may provide input signals that cause the computing system 200 to render a simulated arc. In some examples, the simulated rendering is shown to the operator 116 via display screen 104, which may be part of, or separate from, welding helmet 120.

In some examples, the computing system 200 uses camera-captured images of markers 122 on the welding torch 118 and/or workpiece 110 (and/or other components) to create the simulated rendering. In some examples, the computing system 200 may be configured to recognize the markers 122 on the workpiece 110 and/or welding torch 118, and create a simulated rendering based (at least in part) on the markers 122. For example, the computing system 200 may use the markers 122 to recognize and/or track the welding torch 118, workpiece 110, ruler 150, marking utensil 152, and/or other objects, as well as their respective shapes, sizes, orientations, spatial relationships, etc. In some examples, the computing system 200 may combine recognition of markers 122 with user input to create the simulated rendering. For example, the computing system 200 may recognize markers 122 on the welding torch 118 near markers 122 on the workpiece 110 and, after recognizing that the user is pressing a trigger 119 of the welding torch 118, create a simulated rendering showing an arc between the welding torch 118 and the workpiece 110, and/or a weld pool proximate the arc endpoint on the workpiece 110. In some examples, the computing system 200 is configured to omit the markers 122 from the simulated rendering.

In some examples, the welding system 100 may be used in the context of live welding. In some live welding examples, the welding torch 118 and/or welding-type power supply 108 may be configured for live welding (rather than simulated welding). In some live welding examples, the computing system 200 may still be configured to generate a rendering for display to the operator 116 (e.g., via display screen 104). However, instead of including simulated arcs or simulated weld pools in the rendering, the computing system 200 may instead render certain visuals to provide guidance and/or feedback to the operator 116 during live welding operations. In some live welding examples, the display screen 104 may be arranged around a periphery (or other portion) of the faceplate 121, arranged to obstruct only a small portion of the faceplate 121, and/or configured to allow the operator 116 to see through the faceplate without obscuring the view of the live welding operations.

FIG. 2 is a block diagram illustrating some components of the welding system 100 of FIG. 1. In the example of FIG. 2, the computing system 200 is in communication with the user interface 106, the display screen 104, the welding-type power supply 108, the welding torch 118 (e.g., through the welding-type power supply 108), and the cameras 114 (e.g., through the camera controller(s) 124). In some examples, the cameras 114 may be in direct communication with the computing system 200 without going through the camera controller(s) 124. In some examples, the welding torch 118 may be in direct communication with the computing system 200 without going through the welding-type power supply 108. As shown, the computing system 200 includes communication circuitry 202 configured to facilitate communication between the computing system and the user interface 106 (and/or helmet interface 113), the display screen 104, one or more welding components (e.g., welding torch 118), and the cameras 114 (e.g., through the camera controller(s) 124).

In some examples, the communication circuitry 202 may comprise hardware, firmware, and/or software configured for communication with the various components of the welding system 101. In some examples, the communication circuitry 202 may comprise one or more network interfaces, such as, for example, an IEEE 2502.X and/or 802.11x compliant network interface. In some examples, the display screen 104, welding-type power supply 108, and/or welding torch 118 may comprise similar communication circuitry configured to facilitate communication with communication circuitry 202 of the computing system 200.

In the example of FIG. 2, the computing system 200 also includes memory 206 and one or more processors 204. As shown, the memory 206, processor(s) 204, and communication circuitry 202 are in electrical communication with each other, such as through a common data bus. The one or more processors 204 are configured to execute instructions stored in the memory 206. In the example of FIG. 2, the memory 206 stores executable instructions that, when executed by the processor, further operation of the welding system 100. As shown, the memory 206 stores instructions relating to a weld monitoring process 300 and a virtual marking process 500.

In the example of FIG. 2, the memory 206 also stores data that may be used by the weld monitoring process 300 and/or virtual marking process 500. In particular, as shown, the memory 206 stores one or more three dimensional models 250 (e.g., of workpieces 110, ruler 150, marking utensil 152, welding torch 118, etc.), one or more scores 350 (e.g., one or more performance scores 350 for one or more operators 116), weld criteria 352 (e.g., criteria to determine the score(s)), and marking data 550 (e.g., data related to virtual marking of workpieces 110). In some examples, some or all of the 3D model(s) 250, score(s) 350, weld criteria 352, and/or marking data 550 may be stored in (and/or retrieved from) an external memory (e.g., flash drive, compact disc, external hard drive, network storage, etc.).

In some examples, the 3D models 250 may be used by the computing system 200 when processing images captured by the cameras 114, such as to facilitate object recognition and/or location analysis. In some examples, the scores 350 may be used as a numerical representation of operator performance. In some examples, each score 350 may be a numerical value (e.g., 0-100), a letter grade (e.g., A, B, C, D, etc.), a color (e.g., green, yellow, red, etc.), a label (e.g., Very Good, Good, Adequate, Bad, Very Bad, Pass, Fail, etc.), and/or some other indication of the performance of the operator 116.

In some examples, the weld criteria 352 comprise criteria upon which the operator score(s) 350 may be at least partially based. In the example of FIG. 2, the weld criteria 352 include target weld locations (e.g., absolute and/or workpiece 110 relative beginning/intermediate/ending coordinates), target order of the welds, target weld settings (e.g., voltage, current, gas type, wire feed speed, workpiece material type, filler type, etc.) for each weld, and target weld techniques (e.g., torch angle, torch speed, torch tip to work distance, etc.) for each weld. In some examples, the weld criteria 352 may be different for different operators 116 and/or different welding projects. In some examples, some or all of the weld criteria 352 may be input and/or edited by one or more operators 116 and/or other users (e.g., teachers, trainers, supervisors, etc.), and/or imported from an external source.

In some examples, the marking data 550 comprises data related to virtual markings 600. In the example of FIG. 2, the marking data 550 includes marking locations (e.g., absolute and/or workpiece relative beginning/intermediate/ending coordinates of virtual marking(s)), marking details (e.g., length(s), angle(s), curvature(s), order, associated weld settings, associated weld technique(s), etc.), marking properties (e.g., color(s), style(s), transparency, thickness, filling, etc.), active marking(s) (e.g., which, if any, virtual marking(s) 600 are active), marking mechanism(s) (e.g., parameters of active and/or potential marking mechanism(s)), and mode (e.g., marking mode, information mode, operation mode, etc.). In some examples, the marking data 550 may include more or less data (e.g., no mode). In some examples, some or all of the marking data 550 may be input and/or edited by one or more operators 116 and/or other users (e.g., teachers, trainers, supervisors, etc.), and/or imported form an external source.

Figure 3:
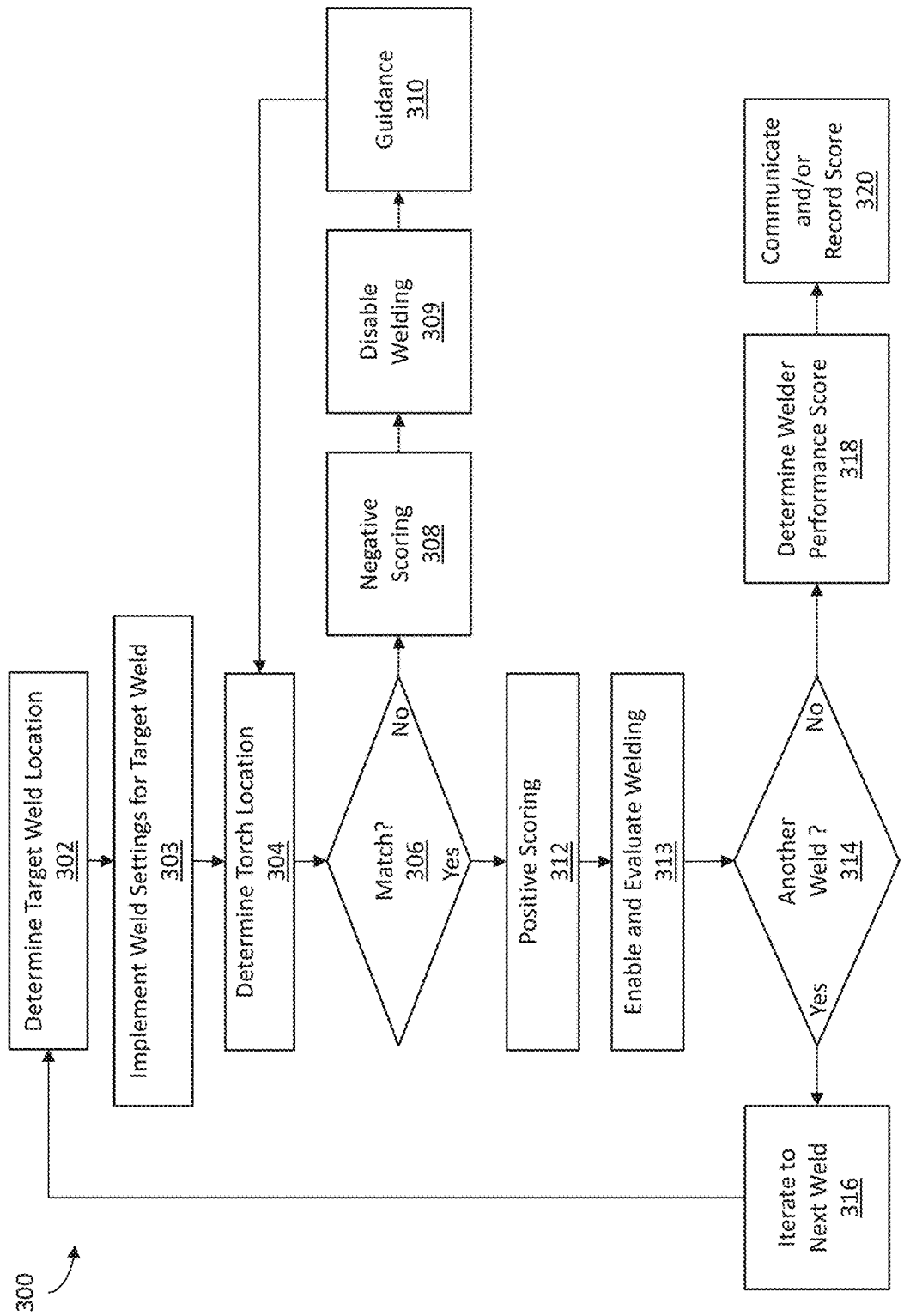
FIG. 3 is a flow diagram illustrating an example weld monitoring process that may be used with the example welding system of FIGS. 1 and 2, in accordance with aspects of this disclosure.

FIG. 3 is a flowchart illustrating an example weld monitoring process 300 of the welding system 100. In some examples, some or all of the weld monitoring process 300 may be implemented in machine readable instructions stored in memory 206 and/or executed by the one or more processors 204. In some examples, some or all of the weld monitoring process 300 may be implemented in analog and/or discrete circuitry. In some examples, the weld monitoring process 300 may be implemented via the welding-type power supply 108, such as through control circuitry 134 (and/or memory 136 and processor(s) 138). In some examples, the weld monitoring process 300 is configured to monitor welding operations (e.g., conducted via welding torch 118), such as by processing the images captured by cameras 114 along with the various inputs and/or settings of the welding system 100 and evaluating against weld criteria 352.

In the example of FIG. 3, the example weld monitoring process 300 is illustrated with respect to a single weld project (and/or session) having one or more welds. In the example of FIG. 3, the weld monitoring process 300 begins at block 302, where the first (or next) target weld is determined, along with the target weld location. In some examples, the target weld and/or target weld location may be determined based on the weld criteria 352 (e.g., the target weld locations and/or target weld order). In some example, the target weld may comprise multiple welds, such as if, for example, any of a set of welds would be acceptable according to the order in the weld criteria 352. In some example, the target weld may comprise a single specific weld, such as if, for example, a particular weld should be next performed according to the order in the weld criteria 352. As shown, the weld monitoring process 300 proceeds to block 303 after block 302.

At block 303, the weld monitoring process 300 determines target weld settings for the target weld and communicates (e.g., via one or more signals) with the welding-type power supply 108 to implement (e.g., via the control circuitry 134) the target weld settings. In some examples, the target weld settings are determined based on the weld criteria 352 and the target weld. In some examples, block 303 may be skipped, allowing (or requiring) the operator 116 to manually enter the weld settings. At block 304, the weld monitoring process 300 determines a location and/or orientation of the welding torch 118, such as by processing the images (and/or markers 122) captured by cameras 114. In some examples, the weld monitoring process 300 may use marker based object recognition and tracking techniques to determine the location of the welding torch 118 from the images captured by the cameras 114.

At block 306 the weld monitoring process 300 determines whether the location of the welding torch 118 matches the target weld location. In some examples, the determination at block 306 may only occur when and/or while a certain input is detected (e.g., a signal indicating the trigger 119 is activated). In some examples, this determination may involve a comparison of the location of the welding torch 118 to the target weld location. For example, the weld monitoring process 300 may compare a location of the welding torch 118 (and/or a specific portion of the welding torch 118, such as the nozzle) to one or more points and/or paths representative of the target weld location (and/or an area proximal to and/or within a threshold distance of the target weld location). If the weld monitoring process 300 determines that the location of the welding torch 118 does not match the target weld location, or is outside some threshold area around to the target weld location, then the weld monitoring process 300 proceeds to block 308. If the weld monitoring process 300 determines that the location of the welding torch 118 matches the target weld location, or is within some threshold area around to the target weld location, then the weld monitoring process 300 proceeds to block 312.

At block 312, the weld monitoring process 300 positively impacts the score 350 in response to the positive match at block 306. For example, the weld monitoring process 300 may increase a weld score for that particular target weld, record a certain positive point value for that particular target weld, decline to decrement the current score (e.g., where the current score starts at 100), and/or otherwise positively impact the score 350. In some examples, the operator 116 may be informed of the positive scoring impact via the display screen 104 and/or user interface 106, such as through one or more audible and/or visual indications (e.g., chime, a cheer, a check mark, a plus sign, an up arrow, the score increase amount, etc.).

Figure 4B:
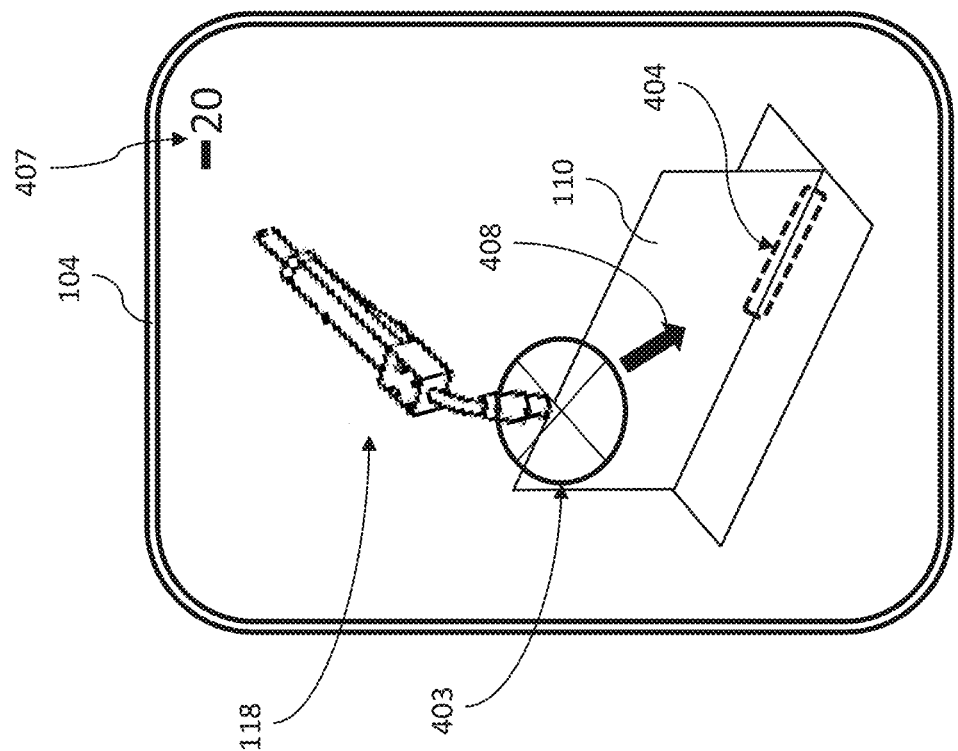
FIGS. 4a and 4b illustrate example weld monitoring outputs to a display screen of the welding system of FIGS. 1 and 2, in accordance with aspects of this disclosure.
Figure 4A:
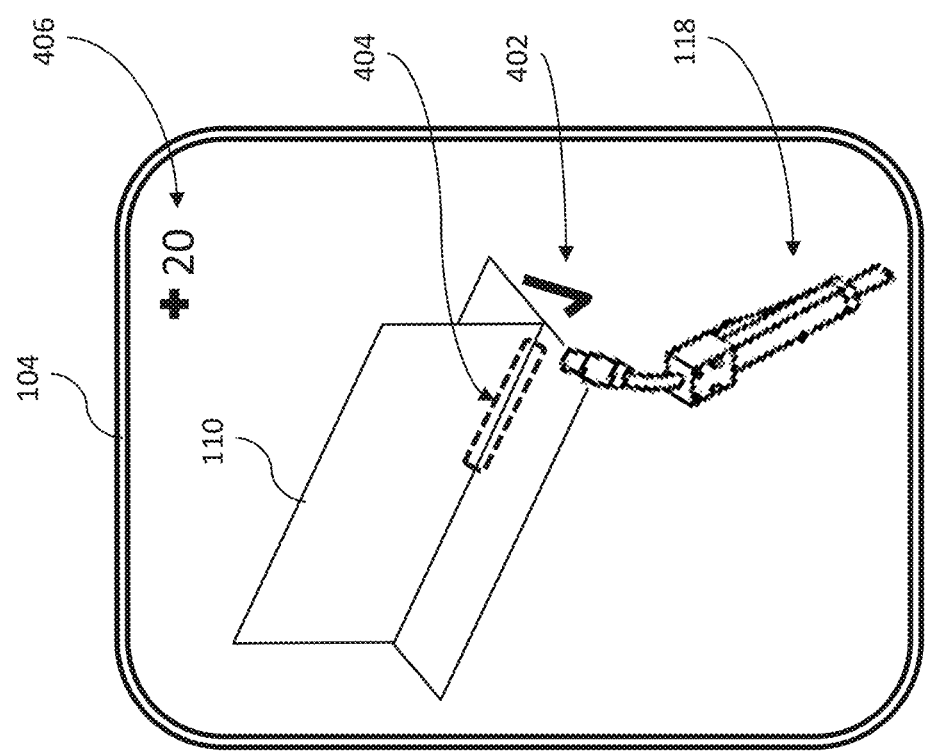

FIG. 4a shows an example of positive visual indications provided to the display screen 104 in response to a positive match at block 306. As shown, a check mark 402 is displayed next to the target weld location 404 to indicate the welding torch 118 is in the proper location for the current weld. Additionally, a score increase indication 406 of "+20" is shown in the upper right hand corner of the display screen 104. In the example of FIG. 3, the weld monitoring process proceeds to block 313 after block 312.

However, in response to a negative match at block 306, the weld monitoring process 300 negatively impacts the score 350 at block 308. For example, the weld monitoring process 300 may decrease a weld score for that particular target weld, record a certain negative point value for that particular target weld, decrement the current score (e.g., where the current score starts at 100), and/or otherwise negatively impact the score 350. In some examples, the operator 116 may be informed of the negative scoring impact via the display screen 104 and/or user interface 106, such as through one or more audible and/or visual indications (e.g., a buzzer, a boo, an "X" mark, a minus sign, a down arrow, the score decrease amount, etc.). In the example of FIG. 3, the weld monitoring process 300 proceeds to block 309 after block 308.

At block 309, the weld monitoring process 300 disables welding operations. In some live welding examples, the weld monitoring process 300 may disable welding operations by communicating (e.g., via one or more signals) an appropriate disable request (or command) to the welding-type power supply 108. The welding-type power supply 108 may, in turn, cease (e.g., via the control circuitry 134) generating and/or sending welding-type power to the welding torch 118. In some augmented reality welding examples, the computing system 200 may disable welding operations by simply declining to generate simulated renderings depicting a simulated welding operation. In some examples, block 309 may be skipped altogether, such as, for example, in response to an override undertaken (e.g., via the user interface 106 and/or operator interface 144) by an operator 116 with appropriate authorizations and/or credentials. As shown, the weld monitoring process 300 proceeds to block 310 after block 309.

At block 310 the weld monitoring process 300 provides guidance to the operator 116 to assist in bringing the actual location of the welding torch 118 into alignment with the target weld location 404. In some examples, the guidance may be audible and/or visual, such as, for example, verbal cues, arrows, directions, coordinates, outlines, highlighting, diagrams, and/or other appropriate forms of guidance. In some examples, the guidance may be provided via the user interface 106 and/or operator interface 144.

FIG. 4b shows an example of negative visual indications that may be provided to the display screen 104 at blocks 308 and/or 310. As shown, an "X" mark 403 is displayed over the tip (and/or nozzle) of the welding torch 118 to indicate that the welding torch 118 is not at the target weld location 404. As shown, an arrow 408 is displayed pointing from the welding torch 118 towards the target weld location 404. In the example of FIG. 4b, a "−20" score decrease indication 407 is shown in the upper right hand corner of the display screen 104.

In the example of FIG. 3, the weld monitoring process 300 proceeds to block 304 after block 310 in order to reevaluate the location of the welding torch 118. In some examples, such reevaluation may be used to determine whether the operator 116 has moved the welding torch 118 to a different location in response to the guidance. In some examples, the weld monitoring process 300 may instead proceed to block 313 or 314 after block 310, such as in response to an override undertaken (e.g., via the user interface 106 and/or operator interface 144) by an operator 116 with appropriate authorizations and/or credentials.

In the example of FIG. 3, the weld monitoring process 300 proceeds to block 313 after block 312. At block 313, the weld monitoring process 300 enables welding operations. In some live welding examples, the weld monitoring process 300 may enable welding operations by communicating (e.g., via one or more signals) an appropriate enable request (or command) to the welding-type power supply 108. The welding-type power supply 108 may, in turn, control (e.g., via the control circuitry 134) the power conversion circuitry 132 to generate and/or send welding-type power to the welding torch 118. In some augmented reality welding examples, the computing system 200 may enable welding operations by generating simulated renderings depicting a simulated welding operation in response to appropriate inputs (e.g., a signal indicating the trigger 119 is activated).

In some examples, the determination at block 306 may occur again and/or continuously at block 313 while a certain input is detected (e.g., the entire time there is a signal indicating the trigger 119 is pressed, held, and/or otherwise activated). In some examples where the determination occurs continuously, the weld monitoring process 300 may record the number (and/or frequency) of matching and/or mismatching determinations for evaluation. In some examples where the determination occurs continuously, blocks 306, 308, 309, 310, and/or 312 may repeat until some terminating input (and/or lack of input) is detected (e.g., a signal and/or lack of signal indicating cessation of welding and/or release of the trigger 119), at which point the evaluation aspect of block 313 may execute.

The weld monitoring process 300 further evaluates welding operations at block 313. In some examples, the evaluation at block 313 comprises evaluating the weld settings against the target weld settings of the weld criteria 352. The evaluation of weld settings may be performed if, for example, block 303 was skipped, or to determine if any adjustments were made after block 303. In some examples, the evaluation at block 313 may further comprise monitoring movement of the welding torch 118 (e.g., via the cameras 114) and determining characteristics of the welding operation. For example, the monitored characteristics may be indicative of the welding technique of the operator 116, and the weld monitoring process 300 may evaluate the welding technique against the targeted welding technique of the weld criteria 352. In some examples, the weld monitoring process 300 records the characteristics (and/or evaluations) in memory 206. In some examples, the evaluation may positively or negatively (or neutrally) impact the score 350, depending on how well (or poorly) the monitored settings, techniques, and/or other weld characteristics match up to the target weld criteria 352.

In the example of FIG. 3, the weld monitoring process proceeds to block 314 after block 313. At block 314, the weld monitoring process 300 determines whether there is another weld for this weld project. If there is another weld, the weld monitoring process 300 iterates to the next weld at block 316, and then proceeds back to block 302. If there is no other weld, the weld monitoring process 300 proceeds to block 318.

At block 318, the weld monitoring process 300 determines an overall performance score 350 for the operator 116. In some examples, the performance score 350 may be an average of performance scores for each individual weld in the weld project. In some examples, the performance score 350 may be a weighted average of performance scores for each individual weld in the weld project, where some individual welds are worth (and/or weighted) more than others depending on their importance or criticality to the overall assembly. In some examples, the weld criteria 352 may include weights for each weld in the weld project and/or the weld monitoring process 300 may use the weld criteria 352 to determine weights. As shown, the weld monitoring process 300 proceeds to block 320 after block 318, where the weld monitoring process 300 communicates the score 350 to the operator 116, such as via the user interface 106 and/or operator interface 144.

FIG. 5a is a flowchart illustrating an example virtual marking process 500 of the welding system 100. In some examples, the virtual marking process 500 is configured to generate one or more virtual markings 600 in response to one or more dynamic input(s) indicating a location (e.g., on a workpiece 110) for the virtual marking(s) 600. In some examples, some or all of the virtual marking process 500 may be implemented in machine readable instructions stored in memory 206 and/or executed by the one or more processors 204. In some examples, some or all of the virtual marking process 500 may be implemented in analog and/or discrete circuitry. In some examples, the virtual marking process 500 may be implemented via the welding-type power supply 108, such as through control circuitry 134 (and/or memory 136 and processor(s) 138). In some examples, the virtual marking process 500 may be initiated and/or terminated by an operator 116, some other user, and/or programmatically (e.g., via another program and/or process).

In the example of FIG. 5a, the virtual marking process 500 begins at block 502. At block 502, the virtual marking process 500 displays existing virtual markings 600 (e.g., via the display screen 104). The virtual markings 600 are displayed using marking properties of the virtual markings 600. In some examples, marking properties may include visual properties (e.g., color(s), style(s), transparency, thickness, filling, etc.) of the marks, such as when displayed via display screen 104. In some examples, the virtual marking process 500 determines the marking properties before displaying the existing markings at block 502. For example, the virtual marking process 500 may load previously set marking properties, such as from memory 206 (and/or some other memory). In some examples, marking properties may be automatically set (e.g., by a training program). In some examples, all virtual markings 600 may share the same marking properties. In some examples, marking properties may be individually set for each virtual marking 600. In some examples, some of the virtual markings 600 may share the same marking properties (e.g., default marking properties), while other virtual markings 600 have individualized marking properties. In some examples, some or all of the virtual markings 600 may have (and/or be set to have) different marking properties depending on whether the virtual marking 600 is active (e.g., selected) or inactive (e.g., unselected), and/or the mode of the marking data 550 (e.g., markup mode, information mode, operation mode, etc.).

Figure 6A:
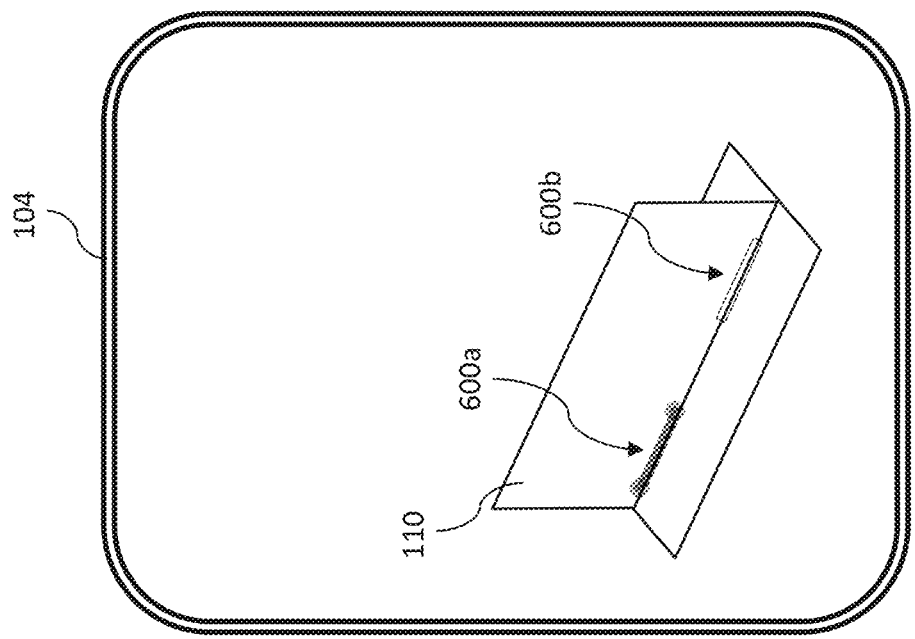
FIGS. 6a and 6b illustrate different example virtual marking properties on a display screen of the welding system of FIGS. 1 and 2, in accordance with aspects of this disclosure.
Figure 6B:
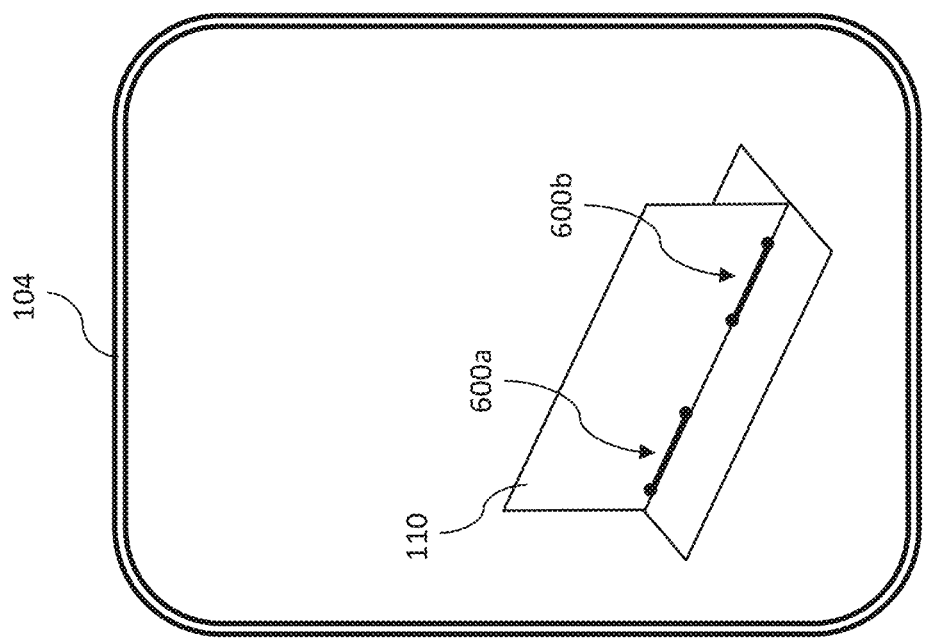
Figure 7B:
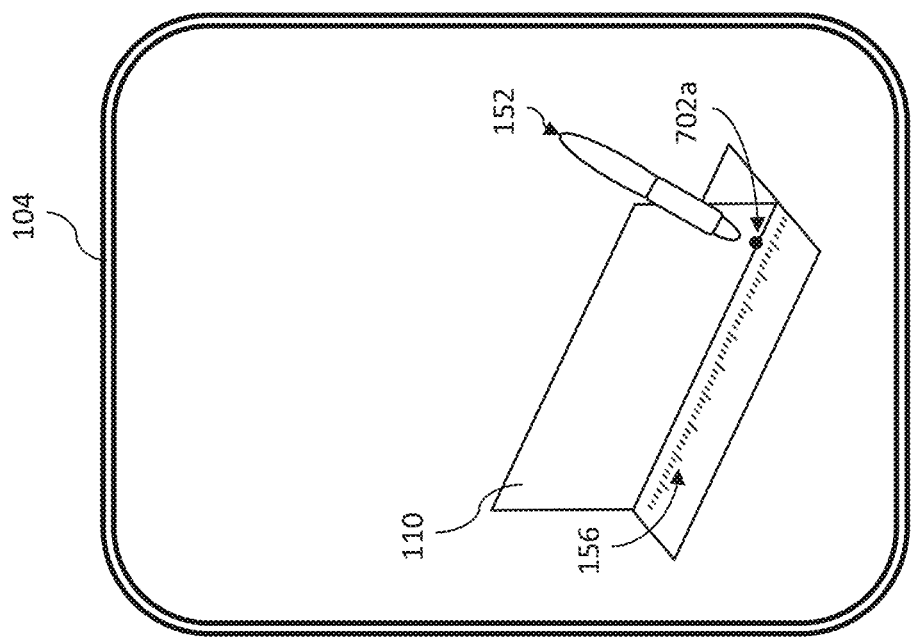
FIGS. 7a-8d illustrate example welding system components, virtual marking mechanisms, and virtual marking outputs to a display screen of the welding system of FIGS. 1 and 2, in accordance with aspects of this disclosure.
Figure 7A:
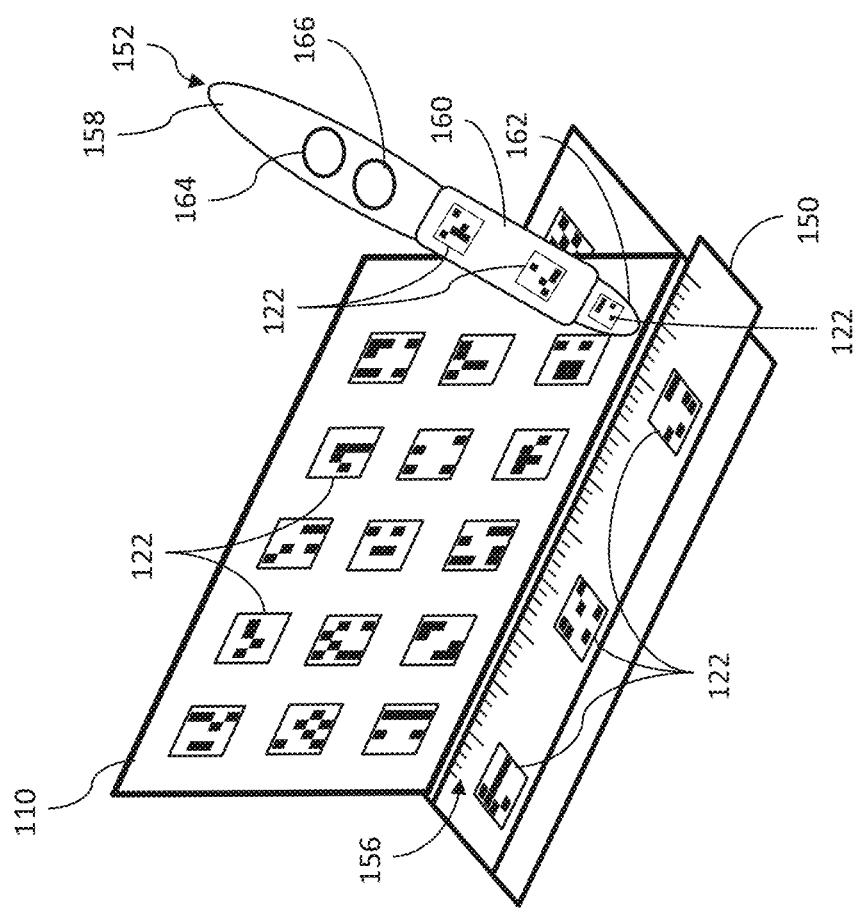
Figure 7D:
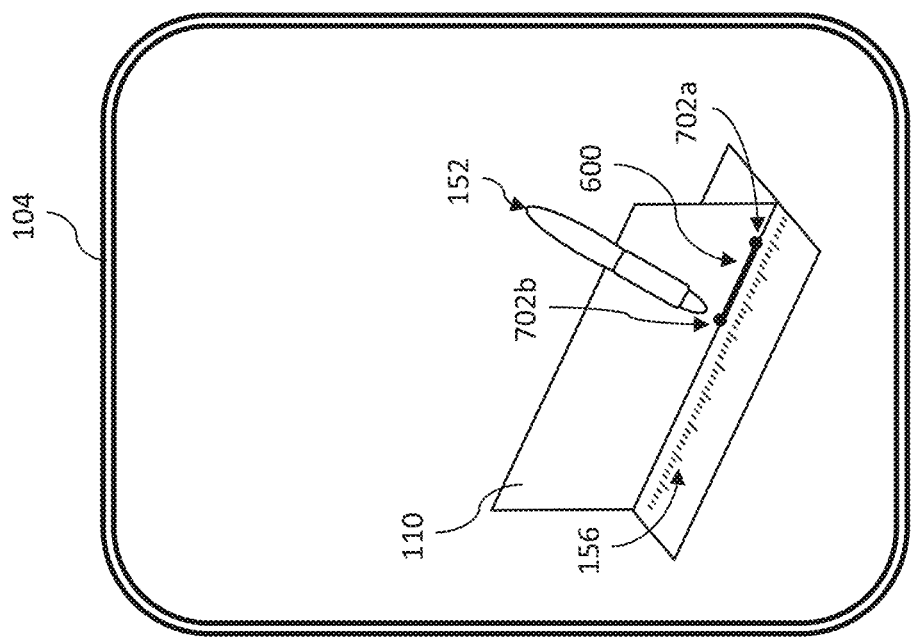
Figure 7C:
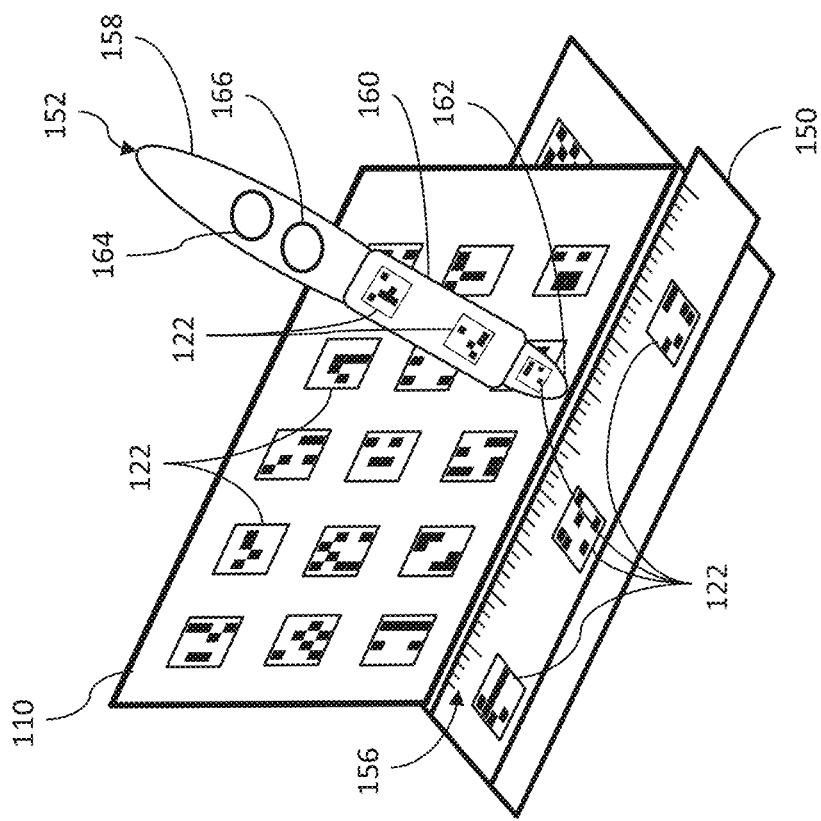

FIG. 6a shows example virtual markings 600 with identical marking properties displayed via display screen 104. FIG. 6b shows example virtual markings 600 with different marking properties displayed via display screen 104. In the examples of FIGS. 6a and 6b, there is a first virtual marking 600a and a second virtual marking 600a. In the example of FIG. 6a, the mode of the marking data 550 is a first mode (e.g., a markup mode). In the example of FIG. 6b, the mode of the marking data 550 is a second mode (e.g., operation mode, information mode, etc.) that is different from the first mode. As shown, first virtual marking 600a and second virtual marking 600b have the same marking properties in the example of FIG. 6a. However, in the example of FIG. 6b, the first virtual marking 600a and second virtual marking 600b have marking properties that are both different from each other, and different from their own marking properties in FIG. 6a. FIG. 9c further illustrates two virtual markings 600 (first marking 600a and second marking 600b) having the same marking properties, while a third virtual marking 600c has different marking properties due to the fact that the third virtual marking 600c is an active marking, while the first virtual marking 600a and second virtual marking 600b are inactive markings.

In the example of FIG. 5a, the virtual marking process 500 loops between block 502, where the virtual markings 600 are displayed, and block 504 until there is an interrupt. At block 504, the virtual marking process 500 checks whether there has been an interrupt. If the virtual marking process 500 determines there has not been an interrupt at block 504, the virtual marking process 500 returns to block 502. If, however, the virtual marking process 500 determines there has been an interrupt at block 504, the virtual marking process 500 proceeds to block 506, where a determination is made as to the type of interrupt.

In some examples, an interrupt may occur when the computing system 200 (and/or virtual marking process 500) receives one or more signals indicative of a dynamic input (e.g., dynamic marking, a dynamic activation/deactivation of a virtual marking 600) or a modification of marking data 550. For example, the operator 116 (or some other user) may dynamically activate the trigger 119 of the welding torch 118 while in markup mode, in which case one or more signals indicative of the trigger activation may be relayed to the computing system 200 and/or virtual marking process 500. As another example, the operator 116 (or some other user) may dynamically activate the secondary input 154 of the welding torch 118, in which case one or more signals indicative of the secondary input 154 activation may be relayed to the computing system 200 and/or virtual marking process 500. As another example, the operator 116 (or some other user) may dynamically activate the first input 164 and/or second input 166 of the marking utensil 152, in which case one or more signals indicative of the first input 164 and/or second input 166 activation may be relayed to the computing system 200 and/or virtual marking process 500. As another example, the operator 116 (or some other user) may dynamically activate the first input 164 and/or second input 166 of the marking utensil 152, in which case one or more signals indicative of the first input 164 and/or second input 166 activation may be relayed to the computing system 200 and/or virtual marking process 500. As another example, the operator 116 (or some other user or program) may modify some or all of the marking data 550 (e.g., via the user interface 106), in which case one or more signals indicative of the modification(s) may be relayed to the computing system 200 and/or virtual marking process 500. As another example, the user interface 106 may receive a user input indicative of a virtual marking creation/modification/removal and/or activation/deactivation, in which case one or more signals indicative of the user input may be relayed to the computing system 200 and/or virtual marking process 500. As another example, the cameras 114 may dynamically capture images and/or the computing system 200 may recognize objects in the camera capture images that induce an interrupt.

In the example of FIG. 5a, if the virtual marking process 500 determines there has not been an interrupt at block 504, the virtual marking process 500 returns to block 502. If, however, the virtual marking process 500 determines there has been an interrupt at block 504, the virtual marking process 500 proceeds to block 506, where a determination is made as to the type of interrupt. In the example of FIG. 5a, the virtual marking process 500 handles the interrupt at one of blocks 508a, 508b, or 508c, depending on the type of interrupt, before returning to the loop at block 502.

At block 506, the virtual marking process 500 determines an interrupt type. In the example of FIG. 5a, there are three different potential interrupt types: (A) an interrupt indicative of modification of some or all of the marking data 550; (B) an interrupt indicative of a dynamic creation, modification, or removal of a virtual marking 600; and (C) an interrupt indicative of a dynamic activation or deactivation of an existing virtual marking 600. If the virtual marking process 500 determines that the interrupt is type A, the virtual marking process 500 proceeds to block 508a. If the virtual marking process 500 determines the interrupt is type B, the virtual marking process proceeds to block 508b. If the virtual marking process 500 determines the interrupt is type C, the virtual marking process proceeds to block 508c. In some examples, there may be more, fewer, and/or different interrupt types.

In the example of FIG. 5a, the virtual marking process 500 proceeds to block 508a when the virtual marking process 500 determines that the interrupt is a type A interrupt indicative of modification of some or all of the marking data 550. At block 508a, the operator 116 (or some other user or program) may select to modify the marking data 550. In some examples, the operator 116 (or other user) may provide an input indicative of a command to modify the marking data 550, such as via the user interface 106, the secondary input 154 of the torch 118, the first input 164 or second input 166 of the marking utensil 152, and/or some other input mechanism. In some examples, a related program (e.g., a training program and/or welding program) may automatically modify the marking data 550 at block 508a. For example, at block 508a modifications may be made to the mode (e.g., to enter/leave markup mode, information mode, operation mode, etc.), the location(s) of one or more existing virtual markings 600, the details of one or more existing virtual markings 600, the properties of one or more existing virtual markings 600, the mechanism(s) for creating, modifying, and/or removing virtual markings 600, and/or which virtual markings 600 are active or inactive. In some examples, the display screen 104 and/or user interface 106 may display the marking data 550 when the modifications are being made. After the modifications are complete, the virtual marking process 500 returns to block 502, as indicated by arrows 501.

In the example of FIG. 5a, the virtual marking process 500 proceeds to block 508b when the virtual marking process 500 determines that the interrupt is a type B interrupt indicative of a dynamic creation, modification, or removal of a virtual marking 600. At block 508b, the virtual marking process 500 handles dynamic creation, modification, and/or removal of virtual markings 600. In some examples, virtual markings 600 may be created, modified, and/or removed at any time. In some examples, virtual markings 600 may only be created, modified, and/or removed during markup mode.

In some examples, some or all other functions (besides marking) of the welding system 100 may be disabled in markup mode. For example, (live or mock) welding operations may be disabled in markup mode so as to allow input mechanisms (e.g., trigger 119 of welding torch 118) that conventionally induce welding responses to instead induce virtual marking responses. In some examples, there may be no markup mode, and only input mechanisms dedicated solely to virtual marking (e.g., secondary input 154 of torch 118, portions of user interface 106, first input 164 and second input 166 of marking utensil 152, etc.) may be used to perform virtual marking operations.

Figure 5B:
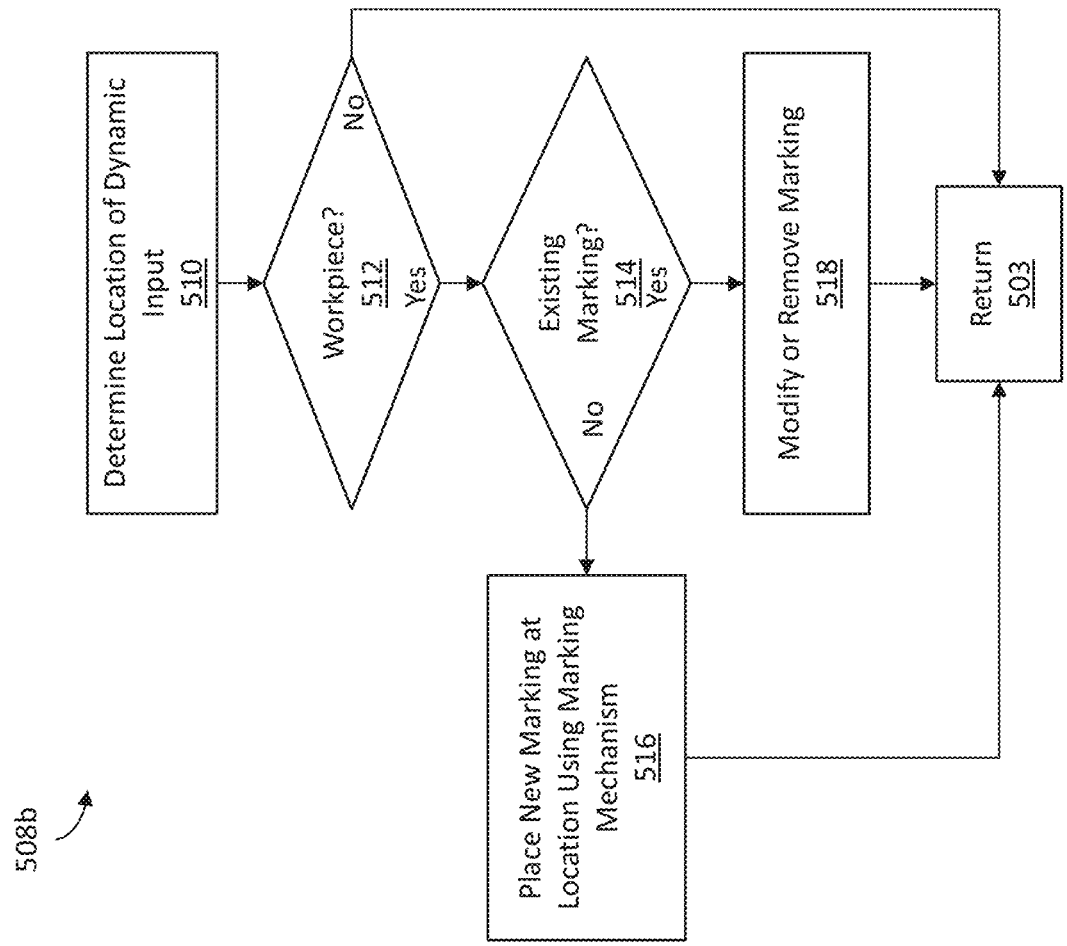

FIG. 5b illustrates an example process for creation, modification, and/or removal of virtual markings 600 in response to a type B interrupt. In some examples, the type B interrupt may comprise a signal indicative of a dynamic input. For example, the dynamic input may comprise activation of the first input 164 and/or second input 166 of the marking utensil 152, or activation of the trigger 119 (e.g., in markup mode) or secondary input 154 of the welding torch 118. In such an example, the dynamic input is associated with a location or position of the marking utensil 152 or welding torch 118 (e.g., location of tip 162 of marking utensil 152 and/or nozzle of welding torch 118). In some examples, the dynamic input may be a user input received via the user interface 106 indicative of a virtual marking creation/modification/removal. In such an example, a representation of the workpiece 110 may be displayed on the user interface 106 and the user input (e.g., received via a touch on the touch screen), may be associated with (and/or translated to) a location or position on the workpiece 110. In some examples, the dynamic input may comprise dynamic recognition of a certain location and/or portion of the workpiece 110 corresponding to a virtual marking 600. For example, when processing the images captured by the cameras 114 in relation to one or more 3D models 250, the computing system 200 may recognize a certain location and/or portion of the workpiece 110 corresponding to a virtual marking 600. In some examples, this recognition may be aided by one or more actual markings 122 on the workpiece 110. In some examples, type B interrupt dynamic inputs may only be received during a certain mode (e.g., markup and/or information mode). In some examples, type B interrupt dynamic inputs may be received any time.

In the example of FIG. 5b, the block 508b process begins at block 510, where the virtual marking process 500 determines the associated location of the dynamic input. For example, the associated location may be a location or position of the marking utensil 152 or welding torch 118 (e.g., location of tip 162 of marking utensil 152 and/or nozzle of welding torch 118), or a certain location on the workpiece 110 dynamically recognized from captured images and/or correlated with a user input via user interface 106. In some examples, determination of the location at block 510 may comprise processing of the images (and/or markers 122 in the images) captured by the cameras 114 in relation to one or more 3D models 250.

In the example of FIG. 5b, the virtual marking process 500 proceeds to block 512 after the location associated with the dynamic input is determined. At block 512, the virtual marking process 500 determines whether the location corresponds to a location of the workpiece 110. If the location does not correspond to a location of the workpiece 110, then the virtual marking process 500 concludes there has been some error or improper marking attempt, and returns (at block 503) to the display and interrupt check loop of block 502 in FIG. 5a. If the location does correspond to a location of the workpiece 110, then the virtual marking process 500 proceeds to block 514.

At block 514, the virtual marking process 500 determines whether there is an existing virtual marking 600 at the location. In some examples, the virtual marking process 500 may use the location associated with the dynamic input and the marking locations in the marking data 550 to make the determination. In the example of FIG. 5b, if there is an existing virtual marking 600 at the location, the virtual marking process 500 proceeds to block 518 where the existing virtual marking 600 may be modified and/or removed. If there is not an existing virtual marking 600 at the location, the virtual marking process 500 proceeds to block 516, where a new virtual marking 600 may be created, such as by using the marking mechanism(s) in the marking data 550, for example.

FIGS. 7a-9b illustrate different example marking mechanisms that may be used at block 516 (and/or block 518). In some examples, the marking mechanism may comprise one or more particular mechanisms for generating (and/or modifying/removing) all or part of a virtual marking 600. The same or different marking mechanisms may be used to create, modify, and/or remove virtual markings. As shown, the measurements 156 of the ruler 150 is rendered and superimposed on the workpiece 110 by the computing system 200 to assist in creating (and/or modifying) virtual markings 600. In some examples, the measurements 156 may be rendered and/or superimposed on the workpiece 110 by the computing system even without the use of the ruler 150. In the disclosure below, virtual marking tool is used to refer to a tool that may be recognized by the virtual marking process 500 (e.g., welding torch 118 and/or marking utensil 152). While the virtual marking tool shown in the examples of FIGS. 7a-8d is the marking utensil 152, other virtual marking tools (e.g., the welding torch 118) may be used.

In the example of FIGS. 7a-7d, a point to point or drag and drop marking mechanism is shown. In the point to point marking mechanism, an operator 116 or other user uses a virtual marking tool (e.g., welding torch 118 or marking utensil 152) to indicate (e.g., via activation of trigger 119, secondary input 154, first input 164, and/or second input 166) a first point 702a and a second point 702b, and the virtual marking process 500 connects the two points 702 to create the virtual marking 600. Though, in the example of FIG. 7d, the virtual marking process 500 has connected the first point 702a and second point 702b with a straight line, in some examples, the virtual marking process 500 may connect the first point 702a and second point 702b with a curved line, such as in view of the selected marking mechanism(s) of the marking data 550. In some examples, more than two points 702 may be identified, so as to form a virtual marking 600 comprising three or more points, connected by two or more straight and/or curved line segments.

In the drag and drop marking mechanism, an operator 116 or other user uses a virtual marking tool (e.g., welding torch 118 or marking utensil 152) to indicate (e.g., via activation of trigger 119, secondary input 154, first input 164, and/or second input 166) a first point 702a, and then moves the virtual marking tool along a desired path to make the virtual marking 600. While the virtual marking tool is moved, the virtual marking process 500 continually generates the virtual marking 600 via generation of numerous additional points 702 following the same path. In some examples, the operator 116 or other user may have to continually activate (e.g., press and hold) an input mechanism of the virtual marking tool for the additional points to be generated. In such an example, the operator 116 or other user may terminate further creation of additional points of the virtual marking 600 by ceasing to activate (e.g., releasing) the input mechanism of the virtual marking tool. In some examples, the numerous additional points may be continually generated until the operator 116 or other user again activates the input. Once the additional points cease being generated, the virtual marking 600 is terminated at the second point 702b. In some examples, the additional points may be continually generated in a straight path, curved path, or free-flowing path depending on the selected marking mechanism of the marking data 550.

Figure 8B:
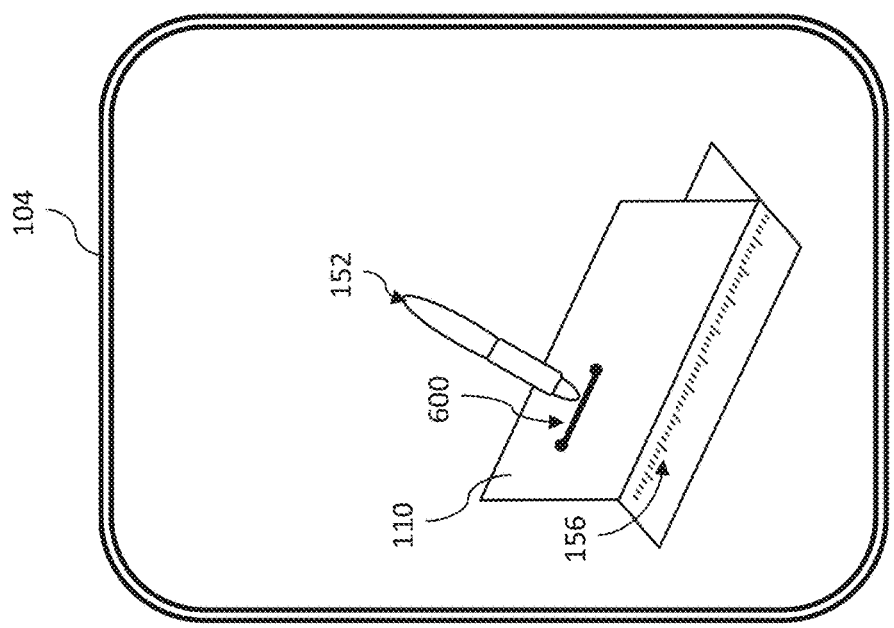
Figure 8A:
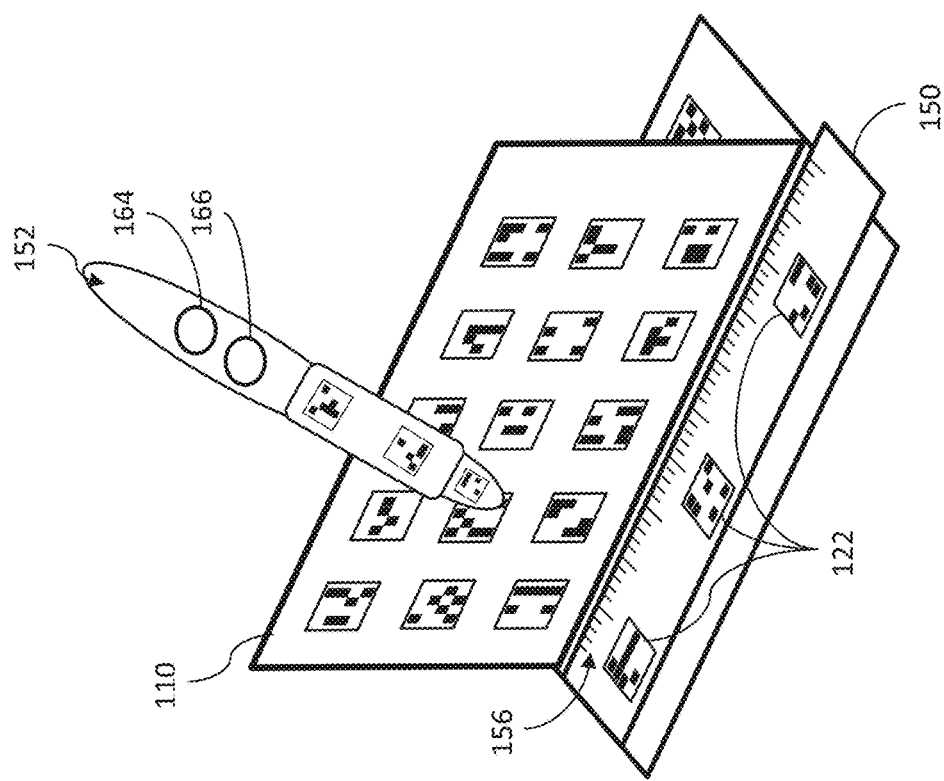
Figure 8D:
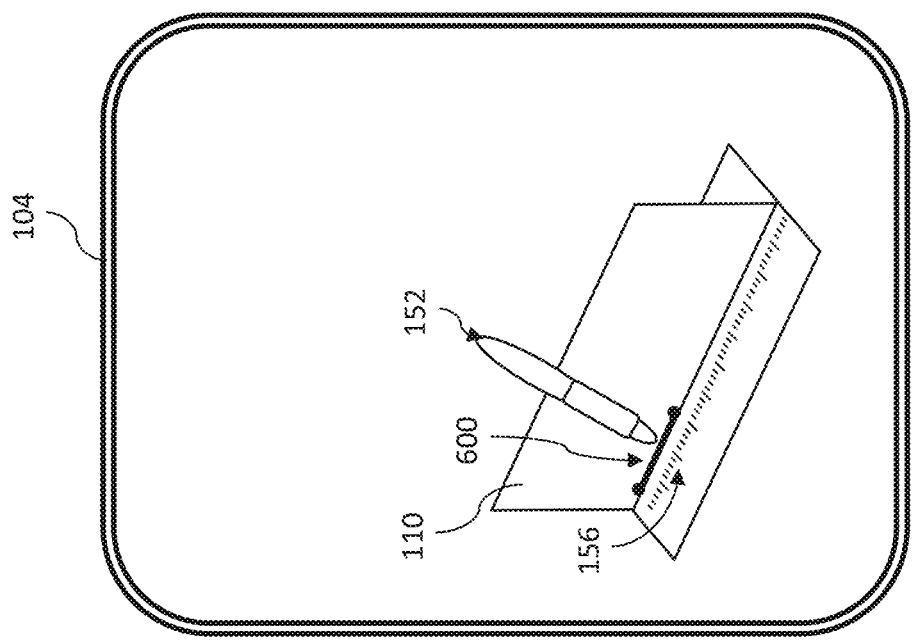
Figure 8C:
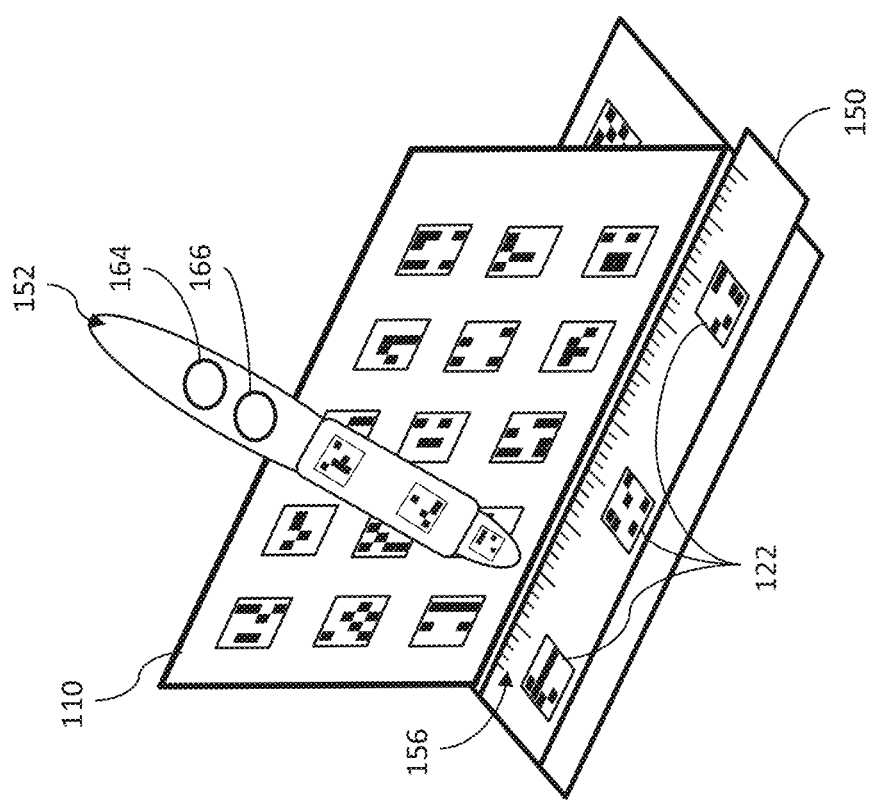

In the example of FIGS. 8a-8d, a pre-formed placement marking mechanism is used, where an already formed virtual marking 600 is placed wholesale using a virtual marking tool. For example, a first activation of the virtual marking tool may create the fully formed virtual marking 600, which may thereafter be moved to the proper location and placed via a second activation of the virtual marking tool. In the example of FIGS. 8a-8b, the virtual marking 600 is created via a first activation (e.g., of the first input 164 or second input 166) of the marking utensil 152, such that the tip 162 of the marking utensil 152 is at an approximate middle of the virtual marking 600. Thereafter, in FIG. 8c-8d, the marking utensil 152 is moved to the appropriate location and the virtual marking 600 is placed via a second activation of the marking utensil 152. In some examples, the virtual marking 600 may be created wholesale and placed without the use of a virtual marking tool, such as in examples, where the dynamic input comprises dynamic recognition from captured images.

Figure 9B:
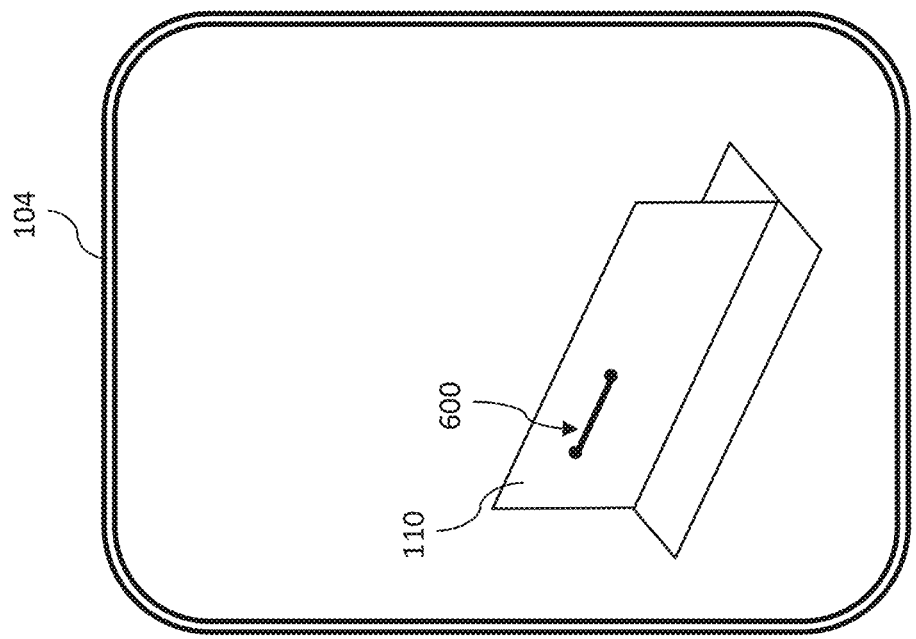
FIGS. 9a and 9b illustrate another virtual marking example using a user interface of the welding systems of FIGS. 1 and 2, in accordance with aspects of this disclosure.
Figure 9A:
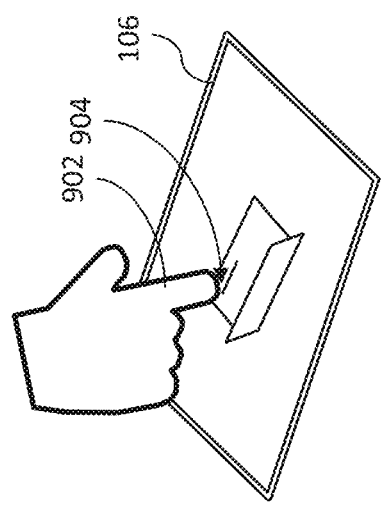

In the examples of FIGS. 9a and 9b, the virtual marking 600 is created via the user interface 600. As shown, a finger 902 of the user touches a point 904 on the display of the user interface 106 depicting the workpiece 110 to create the virtual marking 600. In some examples, the user interface 106 may not be a touch screen, and an input from a mouse or other conventional input device may replace the touch of the finger 902 of the user. In some examples, the point to point, drag and drop, and/or pre-formed placement marking mechanisms described above may be used in this way to create the virtual marking 600 via the user interface 106. In some examples, the computing system and/or virtual marking process 500 may translate the location of the point # on the display of the user interface 106 to a location associated with the workpiece 110 (and/or a location associated with the 3D model of the workpiece 110), and handle the creation of the virtual marking 600 accordingly. In the example of FIG. 5b, once the virtual marking 600 is created and placed at block 516, the virtual marking process 500 returns (at block 503) to the display and interrupt check loop of blocks 502, 504 in FIG. 5a.

In the example of FIG. 5b, if there is an existing virtual marking 600 at the location, the virtual marking process 500 proceeds to block 518 where the existing virtual marking 600 may be modified and/or removed. In some examples, the operator 116 or other user may indicate the type of modification or erasure (e.g., modification of point location, number of points, linear or curved connection, whole erasure, erasure of single point, erasure of portion of connection, etc.) using the user interface 106, different input mechanisms of the virtual marking tool, and/or different activation methods (e.g., double clicking, single clicking, press and hold, press and release, etc.). For example, where the point to point marking mechanism is used, an operator 116 may modify the placement of points by activating an input mechanism of the virtual marking tool when the virtual marking tool is at a location corresponding to the first point 702a or second point 702b, and either dragging and dropping the first point 702a or second point 702b to a new location, or moving the virtual marking tool to the new location and again activating (e.g., depending on marking mechanism settings). As another example, an operator 116 or other user may modify the type of connection (e.g., linear or curved) between the first point 702a and second point 702b through activation of the virtual marking tool. As another example, the virtual marking 600 may be moved wholesale, such as via the pre-formed placement marking mechanism. In the example of FIG. 5b, once the virtual marking 600 is modified or erased at block 518, the virtual marking process 500 returns (at block 503) to the display and interrupt check loop of blocks 502, 504 in FIG. 5a.

FIG. 5c further illustrates a detailed example process dynamically activating or deactivating an existing virtual markings 600 in response to a type C interrupt at block 508c. In some examples, the type C interrupt may comprise a signal indicative of a dynamic input. For example, the dynamic input may comprise activation of the first input 164 and/or second input 166 of the marking utensil 152, or activation of the trigger 119 or secondary input 154 of the welding torch 118. In such an example, the dynamic input is associated with a location or position of the marking utensil 152 or welding torch 118 (e.g., location of tip 162 of marking utensil 152 and/or nozzle of welding torch 118). In some examples, such a dynamic input may only be received during a certain mode (e.g., markup and/or information mode). In some examples, such a dynamic input may be received any time.

In the example of FIG. 5c, the block 508c process begins at block 522, where the virtual marking process 500 determines the associated location of a dynamic input. For example, the associated location may be a location or position of the marking utensil 152 or welding torch 118 (e.g., location of tip 162 of marking utensil 152 and/or nozzle of welding torch 118), or a certain location on the workpiece 110 dynamically recognized from captured images. In some examples, determination of the location at block 520 may comprise receiving and/or processing input via the user interface 106 (e.g., selection of a virtual marking 600 via user interface 106, and determination of corresponding associated marking location via the marking data 550). In the example of FIG. 5c, the virtual marking process 500 proceeds to block 522 after determination of the location of the dynamic input.

At block 522, the virtual marking process 500 determines whether there is an existing virtual marking 600 at the location. In some examples, the virtual marking process 500 may use the location associated with the dynamic input and the marking locations in the marking data 550 to make the determination. In the example of FIG. 5c, if there is not an existing virtual marking 600 at the location, then the virtual marking process 500 concludes there has been some error or improper activation attempt, and returns (at block 503) to the display and interrupt check loop at blocks 502, 504 in FIG. 5a. If there is an existing virtual marking 600 at the location, the virtual marking process 500 proceeds to block 524 where the virtual marking 600 may be activated or deactivated.

At block 524, the virtual marking 600 may be activated or deactivated. In some examples, if the virtual marking 600 is already active then the virtual marking 600 will be deactivated, and if the virtual marking 600 is already inactive then the virtual marking 600 will be activated. In some examples, only one virtual marking 600 may be active at a time, such that activation of a second virtual marking 600 results in automatic deactivation of the first virtual marking 600. In some examples, multiple virtual markings 600 may be active at the same time.

In some examples, the virtual marking process 500 may automatically modify the marking properties corresponding to the virtual marking 600 in response to activation (or deactivation) of the virtual marking 600. For example, the marking properties may be modified to highlight and/or emphasize the active virtual marking(s) 600 (and/or deemphasize inactive virtual marking(s) 600), such as by making the activated virtual marking(s) 600 larger, brighter, more colorful, animated, etc. In some examples, activation or deactivation may be performed through activation of a virtual marking tool when the virtual marking tool is at a location corresponding to the virtual marking 600. In some examples, activation may be performed by simply positioning the virtual marking tool at the location corresponding to the virtual marking 600. In some examples, the virtual marking 600 will stay activated until affirmative deactivation. In some examples, the virtual marking 600 will only stay active as long as the virtual marking tool is positioned at the location corresponding to the virtual marking 600.

In the example of FIG. 5c, the virtual marking process 500 proceeds to block 526 after activation or deactivation in block 524. At block 526, the virtual marking process 500 displays the marking detail for the activated marking(s), such as via display screen 104. In some examples, the marking detail may be continuously displayed as long as the virtual marking 600 is active. In some examples the marking detail for the activated virtual marking 600 may only be displayed while the virtual marking tool is in the position corresponding to the activated virtual marking 600 (and/or an appropriate input is received from the virtual marking tool). After block 526, the virtual marking process 500 returns (at block 503) to the display and interrupt check loop at blocks 502, 504 in FIG. 5a.

FIGS. 10a-10c shows an example of marking details being displayed via display screen 104. In the example of FIG. 10a, the welding torch 118 is positioned with its nozzle at a position corresponding to the location of the virtual marking 600a and has activated the virtual marking 600a, such as through an appropriate input communicated through the welding torch 118 (e.g., switching to information mode via the secondary input 154 and then activating the trigger 118). FIG. 10b illustrates an alternative example of an operator 116 activating the virtual marking 600 through the user interface 106. In the example of FIG. 10c, the display screen 104 shows an activated virtual marking 600c that is emphasized, such that the virtual marking 600c stands out and is distinct from inactive virtual markings 600a and 600b. The marking details (abstracted in FIG. 9c) are shown as appearing in a pop up window 1000 that is indicated as being associated with the virtual marking 600a.

In some examples, the above disclosed welding system 100 may be used in a training setting and/or production setting to provide feedback and/or guidance to operators 116 as they perform live or mock welding tasks, and thereby increase the overall efficiency, productivity, and/or quality of such welding tasks.

While the present apparatus, systems, and/or methods have been described with reference to certain implementations, it will be understood by those skilled in the art that various changes may be made and equivalents may be substituted without departing from the scope of the present apparatus, systems, and/or methods. In addition, many modifications may be made to adapt a particular situation or material to the teachings of the present disclosure without departing from its scope. Therefore, it is intended that the present apparatus, systems, and/or methods not be limited to the particular implementations disclosed, but that the present apparatus, systems, and/or methods will include all implementations falling within the scope of the appended claims.

What is claimed is:

1. A welding system, comprising:
   a sensor configured to capture sensor data relating to a workpiece or a welding tool in a welding environment;
   a display screen configured to display a rendering of the welding environment;
   processing circuitry; and
   a machine readable storage device comprising machine readable instructions which, when executed, cause the processing circuitry to:
   identify a workpiece location of the workpiece, or a tool location of the welding tool relative to the workpiece, based on the sensor data captured by the sensor,
   determine whether there has been a first indication that a marking should be applied to a selected location on the workpiece, the first indication comprising a tool input from the welding tool or a recognition of a marking location on the workpiece, in response to determining there has been the first indication that the marking should be applied to the selected location on the workpiece,
identify the selected location where the marking should be applied based on the tool location or the workpiece location, and
display, in the rendering, on the display screen, the marking on the workpiece at the selected location, the display of the marking being based on a marking property of the marking, and
in response to a second indication that the marking at the selected location on the workpiece should be activated or deactivated,
modify the marking property of the marking to emphasize or deemphasize the marking at the selected location on the workpiece, and
display, or remove display, of marking information associated with the marking.

2. The system of claim 1, wherein the first or second indication comprises the tool input from the welding tool.

3. The system of claim 1, wherein the machine readable instructions, when executed, further cause the processing circuitry to display, in the rendering, on the display screen, dimensions overlaid on the workpiece to aid in creating the marking.

4. The system of claim 1, wherein the marking property comprises a color, a thickness, a transparency, a filling, or a style.

5. The system of claim 4, wherein the marking information comprises a length of the marking, a curvature of the marking, a welding order associated with the marking, a weld setting associated with the marking, or a welding technique parameter associated with the marking.

6. The system of claim 1, wherein the marking comprises a first marking, and wherein the machine readable instructions, when executed, further cause the processing circuitry to: in response to the second indication indicating that the first marking should be activated, deactivate and deemphasize a second marking, the second marking having previously been activated and emphasized.

7. The system of claim 1, further comprising a welding helmet comprising the sensor and the display screen, the sensor comprising a camera sensor, ultrasonic sensor, radio frequency sensor, magnetic sensor, audio sensor, or millimeter wave sensor.

8. The system of claim 1, wherein the tool input is sent from the welding tool in response to actuation of a trigger of the welding tool during a markup mode when a welding-type operation is disabled, or in response to actuation of a non-trigger input of the welding tool.

9. A method of marking in a welding system, comprising:
capturing, via a sensor, sensor data relating to a workpiece or a welding tool;
displaying, on a display screen, a rendering of the workpiece;
identifying a workpiece location of the workpiece, or a tool location of the welding tool relative to the workpiece, based on the sensor data captured by the sensor;
determining, via processing circuitry, whether there has been an indication that a marking should be applied to a selected location on the workpiece, the indication comprising a tool input from the welding tool or a recognition of a marking location on the workpiece;
in response to determining there has been an indication that the marking should be applied to the selected location on the workpiece,
identifying the selected location where the marking should be applied based on the tool location or the workpiece location, and
displaying, in the rendering, on the display screen, the marking on the workpiece at the selected location, the display of the marking being based on a marking property of the marking; and
in response to a second indication that the marking at the selected location on the workpiece should be activated or deactivated,
modifying the marking property of the marking to emphasize or deemphasize the marking at the selected location on the workpiece, and
displaying, or removing display, of marking information associated with the marking.

10. The method of claim 9, wherein the first or second indication comprises the tool input from the welding tool.

11. The method of claim 9, further comprising displaying, in the rendering, on the display screen, dimensions overlaid on the workpiece to aid in creating the marking.

12. The method of claim 9, wherein the marking property comprises a color, a thickness, a filling, a transparency, or a style.

13. The method of claim 9, wherein the marking information comprises a length of the marking, a curvature of the marking, a welding order associated with the marking, a weld setting associated with the marking, or a welding technique parameter associated with the marking.

14. The method of claim 9, wherein the marking comprises a first marking, the method further comprising: in response to the second indication indicating that the first marking should be activated, deactivating and deemphasizing a second marking, the second marking having previously been activated and emphasized.

15. The method of claim 9, wherein the sensor and display screen are part of a welding helmet, the sensor comprising a camera sensor, ultrasonic sensor, radio frequency sensor, magnetic sensor, audio sensor, or millimeter wave sensor.

16. The method of claim 10, wherein the tool input is sent from the welding tool in response to actuation of a trigger of the welding tool during a markup mode when a welding-type operation is disabled, or in response to actuation of a non-trigger input of the welding tool.

* * * * *